(12) United States Patent
Kouda et al.

(10) Patent No.: US 10,193,422 B2
(45) Date of Patent: Jan. 29, 2019

(54) POWER TOOL

(71) Applicant: MAKITA CORPORATION, Anjo-Shi (JP)

(72) Inventors: Kei Kouda, Anjo (JP); Akira Niwa, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 387 days.

(21) Appl. No.: 15/135,979

(22) Filed: Apr. 22, 2016

(65) Prior Publication Data
US 2016/0336838 A1    Nov. 17, 2016

(30) Foreign Application Priority Data

May 13, 2015 (JP) .................................. 2015-098474
May 13, 2015 (JP) .................................. 2015-098475

(51) Int. Cl.
*H02K 7/14* (2006.01)
*H02K 11/215* (2016.01)
(Continued)

(52) U.S. Cl.
CPC ............ *H02K 11/215* (2016.01); *B25B 21/00* (2013.01); *B25B 21/02* (2013.01); *B25F 5/00* (2013.01);
(Continued)

(58) Field of Classification Search
CPC ........ H02K 11/215; H02K 1/146; H02K 3/28; H02K 3/522; H02K 2201/03;
(Continued)

(56) References Cited

U.S. PATENT DOCUMENTS 5,394,045 A    2/1995  Takehara
6,483,213 B1 *  11/2002 Hsu ........................ H02K 3/522
                                                310/68 R
(Continued)

FOREIGN PATENT DOCUMENTS

JP    H0662555 B2    8/1994
JP    2007221976 A   8/2007
(Continued)

OTHER PUBLICATIONS

Office Action from the Japanese Patent Office dated Oct. 2, 2018 in counterpart Japanese application No. 2015-098474, and machine translation thereof.

(Continued)

*Primary Examiner* — Thanh Lam
(74) *Attorney, Agent, or Firm* — J-Tek Law PLLC; Jeffrey D. Tekanic; Scott T. Wakeman

(57) ABSTRACT

A power tool, such as a hammer driver-drill (1), includes a brushless motor (8) having a stator (9) and a rotor (10). The stator (9) has slots (78) between teeth (63) that protrude inwardly. Coils (64) are respectively wound around each tooth (63) and the coils (64) of all phases are delta-connected in series. The rotor (10) includes permanent magnets (68) and is rotatably disposed in the interior of the stator (9). A sensor circuit board (65) is fixed to the stator (9) and includes magnetic sensors (66) that detect the rotational position of the rotor (10). The magnetic sensors (66) are provided at locations that correspond at least substantially to the centers of the slots (78) in the rotational direction of the rotor (10).

20 Claims, 19 Drawing Sheets

(51) Int. Cl.
*H02K 3/28* (2006.01)
*B25F 5/00* (2006.01)
*B25B 21/00* (2006.01)
*H02K 1/14* (2006.01)
*H02K 3/52* (2006.01)
*B25B 21/02* (2006.01)

(52) U.S. Cl.
CPC ............... *H02K 1/146* (2013.01); *H02K 3/28* (2013.01); *H02K 3/522* (2013.01); *H02K 2201/03* (2013.01); *H02K 2213/03* (2013.01)

(58) Field of Classification Search
CPC .... H02K 2213/03; B25B 21/00; B25B 21/02; B25F 5/00
See application file for complete search history.

(56) References Cited

U.S. PATENT DOCUMENTS

| | | | | |
|---|---|---|---|---|
| 7,459,824 | B2* | 12/2008 | Haner | ............ H02K 23/66 310/179 |
| 9,318,932 | B2* | 4/2016 | Purohit | ............ H02K 9/06 |
| 2007/0296292 | A1 | 12/2007 | Kienzler et al. | |
| 2013/0207491 | A1 | 8/2013 | Hatfield et al. | |
| 2014/0001892 | A1* | 1/2014 | Bekavac | ............ H02K 7/145 310/50 |
| 2015/0069864 | A1* | 3/2015 | Nagahama | ............ H02K 29/08 310/50 |
| 2016/0149474 | A1* | 5/2016 | Smith | ............ H02K 1/276 310/50 |
| 2016/0380510 | A1* | 12/2016 | Niwa | ............ H02K 11/215 310/50 |

FOREIGN PATENT DOCUMENTS

| | | |
|---|---|---|
| JP | 2010011637 A | 1/2010 |
| JP | 2010263675 A | 11/2010 |
| JP | 2013021880 A | 1/2013 |
| JP | 2014204596 A | 10/2014 |
| JP | 2015042117 A | 3/2015 |
| JP | 2015056953 A | 3/2015 |

OTHER PUBLICATIONS

Office Action from the Japanese Patent Office dated Oct. 2, 2018 in counterpart Japanese application No. 2015-098475, and machine translation thereof.

* cited by examiner

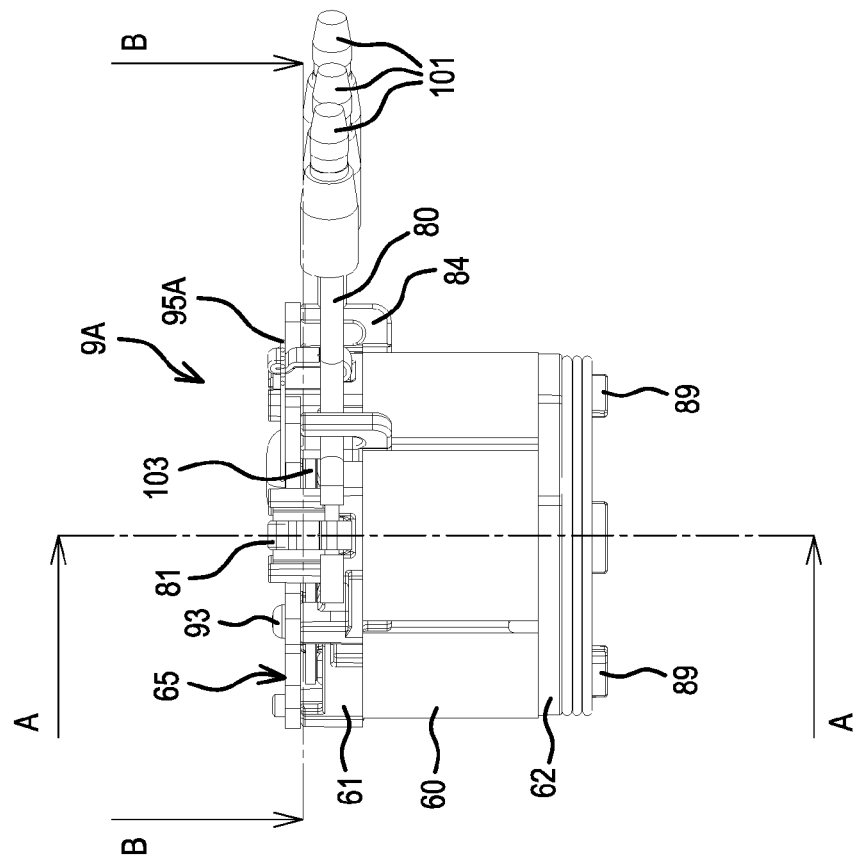
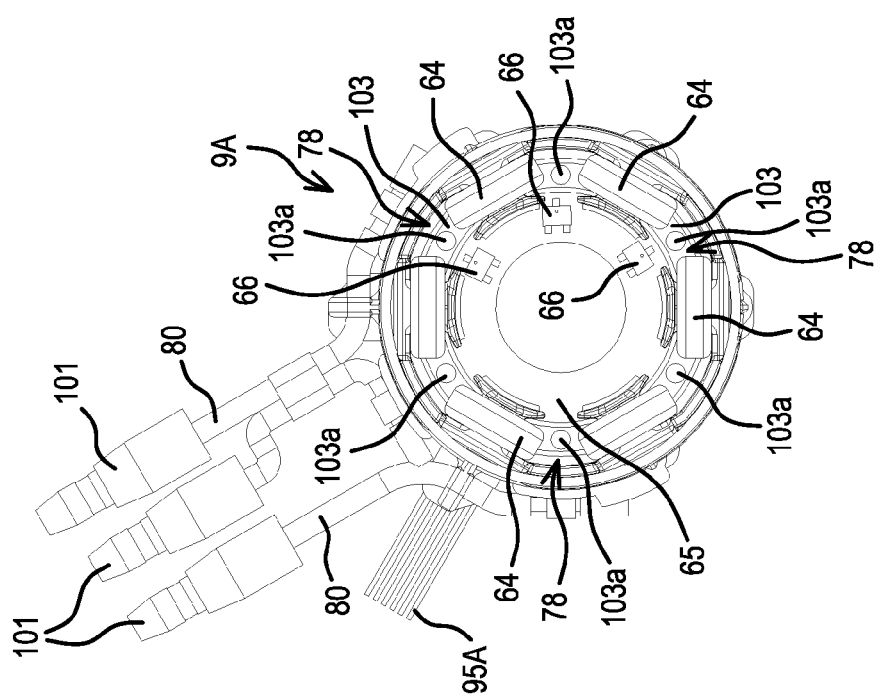

POWER TOOL

CROSS-REFERENCE

The present application claims priority to Japanese patent application serial numbers 2015-098474 and 2015-098475, both filed on May 13, 2015, the contents of which are incorporated fully herein by reference.

TECHNICAL FIELD

The present disclosure relates to a power tool, such as a driver-drill, that utilizes a motor.

BACKGROUND ART

It is known to use brushless motors for certain power tools, including driver drills, because brushless motors are relatively compact and very durable. Such motors include a stator having a plurality (e.g., six) of teeth that protrude radially inwardly. The stator is formed by a plurality of steel plates or laminations, and coils that form different phases are respectively wound around every tooth. The motor also includes a rotor comprising a rotary shaft that passes through the stator and that includes permanent magnets. The motor may also include a discoidal sensor circuit board, which is attached to the stator and has magnetic sensors (Hall effect ICs or the like) that detect the positions of the permanent magnets provided on the rotor.

SUMMARY OF THE INVENTION

In the above-described brushless motor, the timing of the energization, in which the excitation current is respectively supplied to the coils of each phase, may be controlled based on the leading edge (during forward rotation) and the trailing edge (during reverse rotation) of the output signals of the magnetic sensors. However, if advance-phase control is performed, in which the timing of the energization is advanced forward of the leading edge and the trialing edge of the output signals of the magnetic sensors, then losses can be prevented, thereby increasing motor efficiency. Accordingly, in theory, it might be desirable to perform advance-phase control by shifting the positions of the magnetic sensors away from the centers of the teeth in the rotational direction by, for example, an electrical angle of 30°. However, if the motor is a brushless motor, in which the coils of all phases are connected in a delta configuration in series (delta-connected), then there is a risk that the magnetic fluxes detected by the magnetic sensors will be affected (undesirably influenced) by the stator magnetic flux. In this case, the rotational position of the rotor will be detected with an offset.

In addition or in the alternative, in the above-described brushless motor, the coils may be wound around an electrically insulating member at one or both ends of the stator. The electrically insulating member(s) may preferably include one or more retainer walls (sometimes also referred to herein as "stop parts"), which project axially from the stator core and are provided at radially inward portions of the electrically insulating member. These retainer walls or stop parts are designed to prevent the coils wound around the teeth from collapsing inwardly. However, there is a risk that these retainer walls or stop parts will deform in a radially inward direction (inwardly) because of the stresses generated while the coils are being wound, and this may cause the retaining walls to interfere with the rotor.

Accordingly, in one aspect of the present disclosure, a power tool is provided that can perform advance-phase control without being affected by the stator magnetic flux, even in a brushless motor in which the coils of all phases are delta-connected in series. Consequently, motor efficiency can be improved.

In addition or in the alternative to the preceding aspect, in another aspect of the present disclosure, a power tool is provided that can prevent deformation of retainer walls (stop parts) of an electrically insulating member, thereby preventing interference of the retainer walls (stop parts) with a rotor.

In another aspect of the disclosure, a power tool preferably comprises a stator having slots between a plurality of teeth that protrude inwardly with a coil wound around every tooth and in which the coils of all phases are delta-connected in series. The power tool also preferably comprises a rotor having magnets that is configured to rotate (is rotatably disposed) in the interior of the stator. A sensor circuit board is preferably fixed to the stator and includes magnetic sensors configured to detect the rotation (rotational position) of the rotor. The magnetic sensors are provided at locations that correspond at least substantially to the centers of the slots in a rotational direction of the rotor, that is, the locations respectively correspond at least substantially to the circumferential centers of the slots.

In a further aspect of the disclosure, the sensor circuit board is preferably attached to an electrically insulating member provided on an end surface of the stator.

In the present disclosure, the expression "at least substantially the center of a slot" is intended to include an embodiment, in which the (each) slot is located exactly at the center, but also is intended to include embodiments, in which the location of the (each) slot is slightly shifted (displaced) from the center in the rotational direction of the rotor, as long as the slot location(s) is (are) selected such that the stator magnetic flux does not have an effect on the magnetic sensors.

In another aspect of the disclosure, the rotor preferably has an outermost circumferential portion lying on a first circle and the magnetic sensors are disposed along the first circle.

In another aspect of the disclosure, the magnetic sensors are preferably disposed along a circumference at which an outermost-circumference part of an outer shape of the rotor is located.

In another aspect of the disclosure, an outer shape of the rotor is preferably non-circular.

In another aspect of the disclosure, the rotor preferably has a large outer circumferential portion lying on a first circle and a small outer circumferential portion lying on a second circle. The magnetic sensors are disposed on an outer side of the second circle.

In another aspect of the disclosure, a hollow or groove is preferably formed on an outer circumference of the stator along an extension of at least one of the teeth.

In another aspect of the disclosure, the sensor circuit board is preferably screw fastened to the stator at a location along an extension of at least one of the teeth.

In another aspect of the disclosure, a power tool preferably comprises: a stator core comprising a plurality of teeth, an electrically insulating member fixed to the stator core, and coils wound around the respective teeth via the electrically insulating member. The electrically insulating member comprises retainer walls (stop parts) that prevent the coils from collapsing inwardly, and also comprises reinforcing means that reinforce the retainer walls (stop parts).

In another aspect of the disclosure, the reinforcing means includes first and second radially inwardly projecting elements on each of the retainer walls, which elements may form a U-shape.

In another aspect of the disclosure, the reinforcing means is portions of the electrically insulating member extending along each tooth, the portions being axially thicker than a radial thickness of the retainer walls.

In another aspect of the disclosure, the reinforcing means is provided on the side of the electrically insulating member on which a (the) sensor circuit board of a (the) brushless motor is fixed.

In another aspect of the disclosure, a power tool preferably comprises: a stator, comprising: a stator core having six teeth respectively separated by six slots, a wire wound around each of the six teeth in a winding direction, and an electrically insulating member that is fixed to the stator core and that includes a plurality of guide ribs. A rotor is disposed in the interior of the stator, and a tool-accessory retaining part is driven by the rotor. At least two crossover wire portions are arranged axially adjacent to one another on the plurality of guide ribs, and at least one of the crossover wire portions runs (extends) in a direction opposite the winding direction.

In another aspect of the disclosure, two of the crossover wires are led out from one of the coils.

In another aspect of the disclosure, all of the crossover wires run (extend) in the direction opposite the winding direction.

In another aspect of the disclosure, a power tool preferably comprises: a stator core having a plurality of teeth, an electrically insulating member fixed to the stator core, and coils wound around the respective teeth via the electrically insulating member. The coils are respectively wound around the teeth starting from one side in the circumferential direction of the stator core and ending on an other side in the circumferential direction of the stator core.

According to some aspects of the present disclosure, magnetic sensors are provided at locations corresponding to at least substantially the centers of slots in a rotational direction of a rotor (the circumferential centers of the slots). Therefore, even if the coils of the brushless motor are delta-connected in series, advance-phase control can be performed without being affected by the stator magnetic flux, and thereby motor efficiency can be improved.

In addition or in the alternative, according to some aspects of the present disclosure, it is possible to prevent deformation of retainer walls (stop parts) of the electrically insulating member, thereby preventing interference of the retainer walls (stop parts) with a rotor.

BRIEF DESCRIPTION OF THE DRAWINGS

FIG. 14A is a bottom view of the stator of FIG. 13A, and FIG. 14B is a side view thereof.

DETAILED DESCRIPTION OF THE EMBODIMENTS

Embodiments of the present teachings are explained below, with reference to the drawings.

Figure 1:
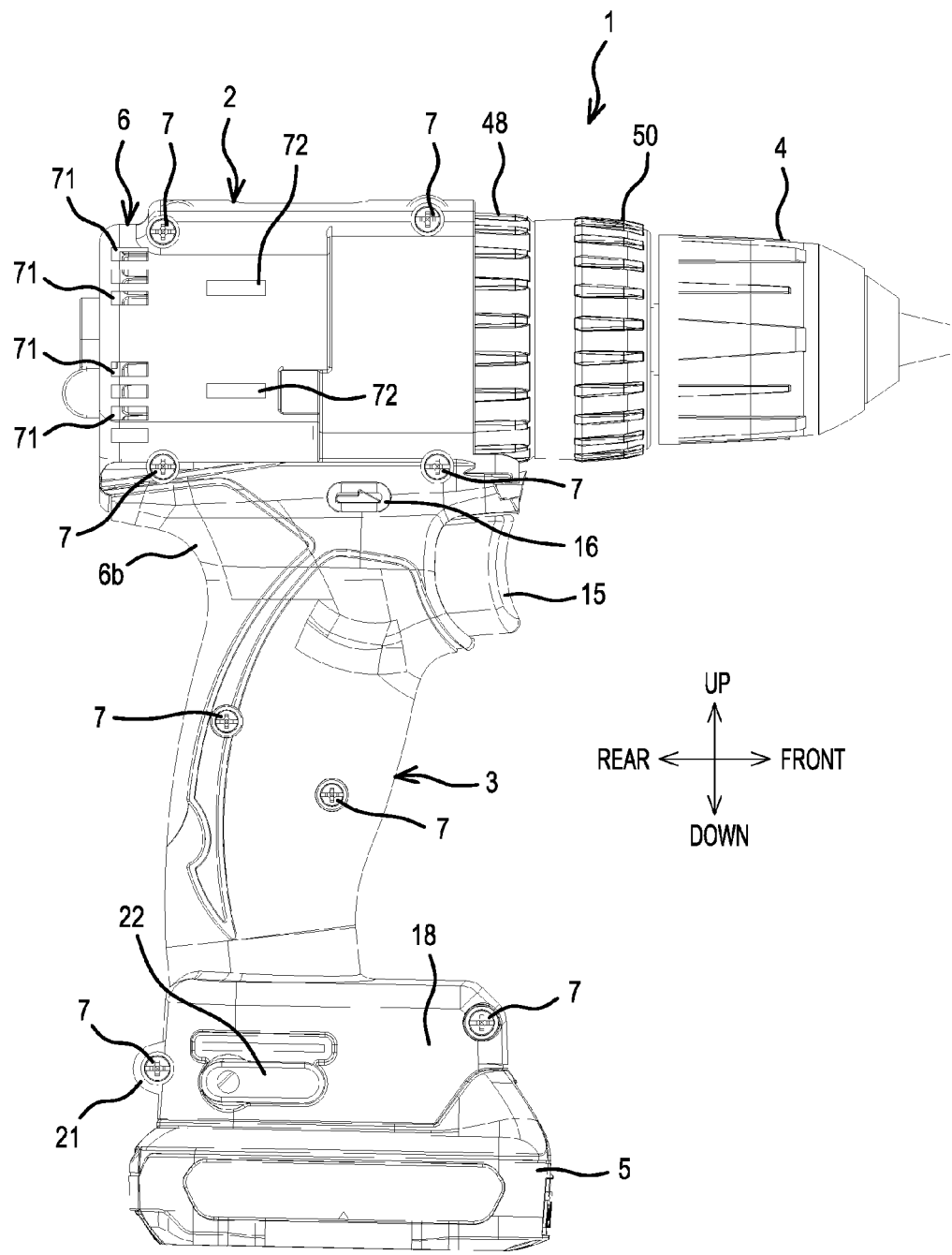
FIG. 1 is a side view of a hammer driver-drill.
Figure 2:
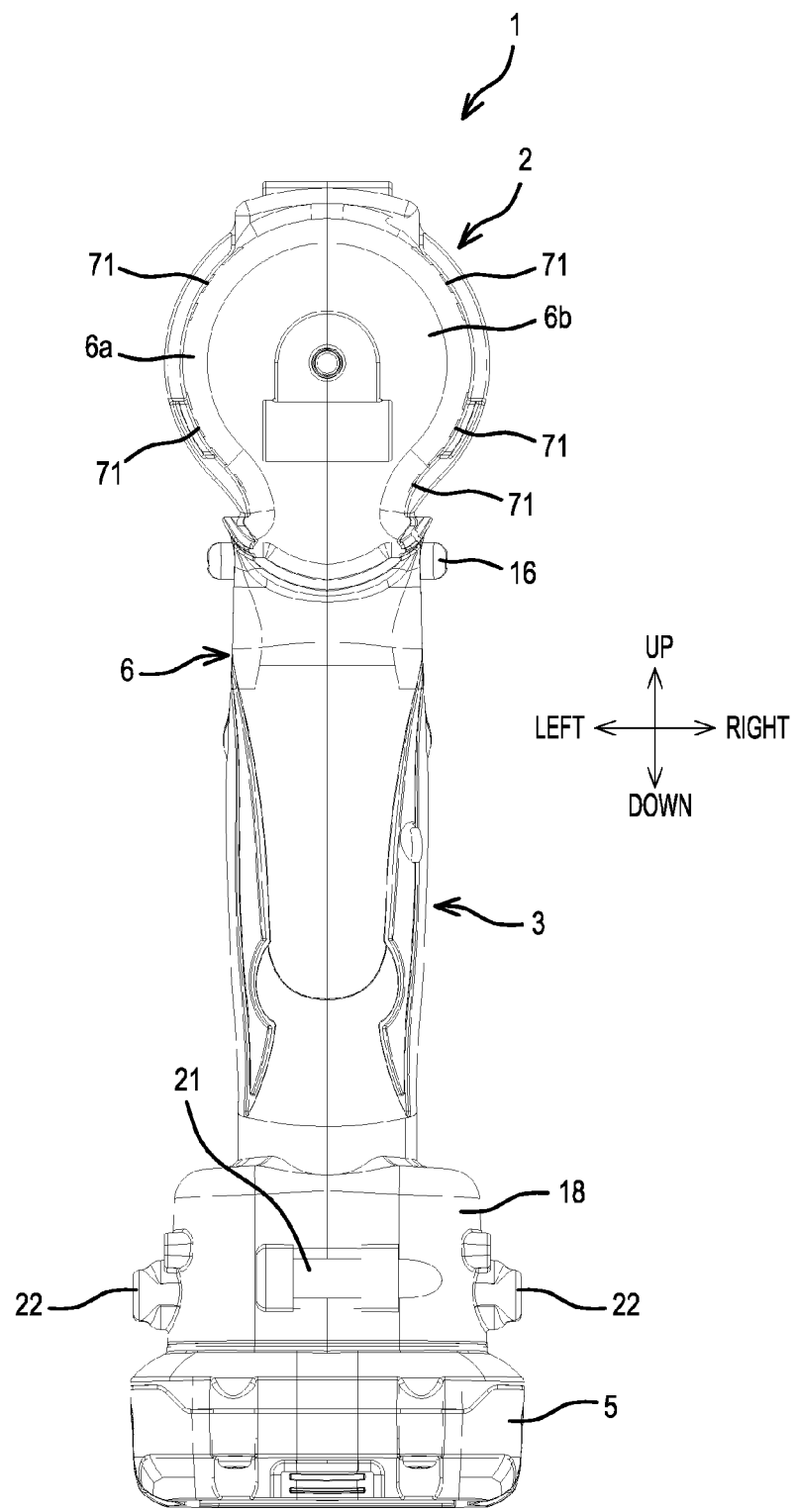
FIG. 2 is a rear view of the hammer driver-drill of FIG. 1.
Figure 3:
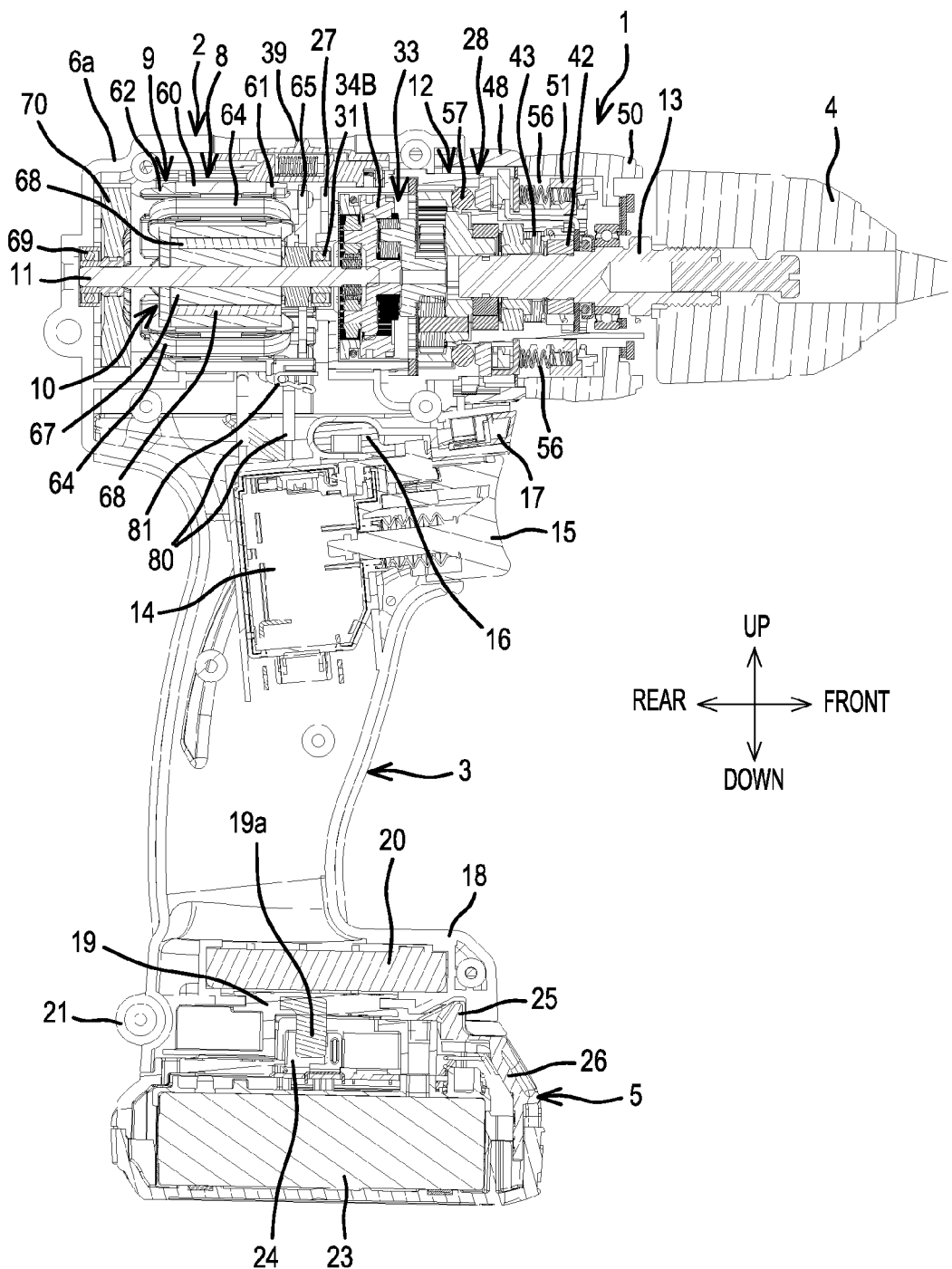
FIG. 3 is a longitudinal, cross-sectional view of the hammer driver-drill of FIG. 1.
Figure 4:
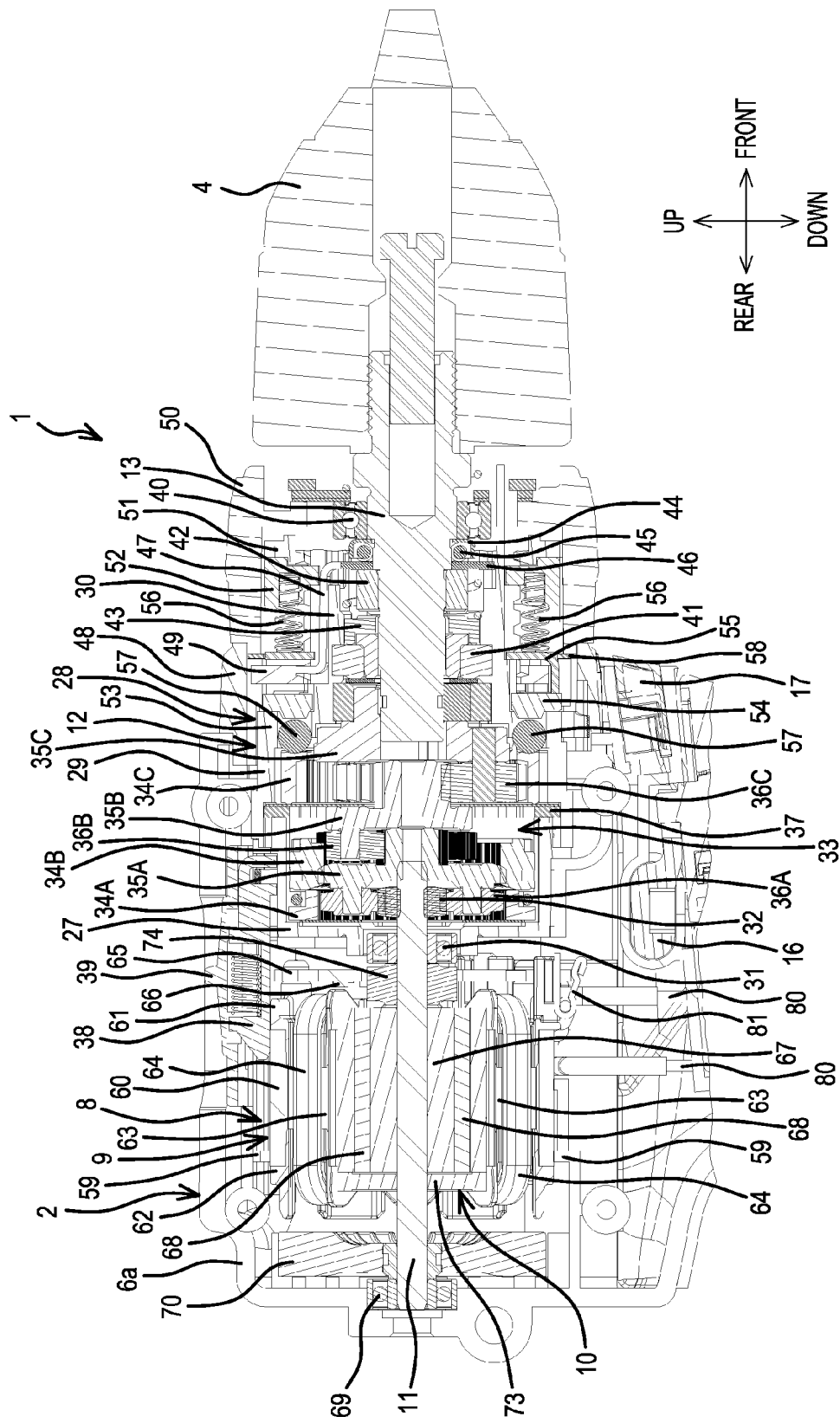
FIG. 4 is an enlarged view of a main body portion of the hammer driver-drill of FIG. 1.
Figure 5:
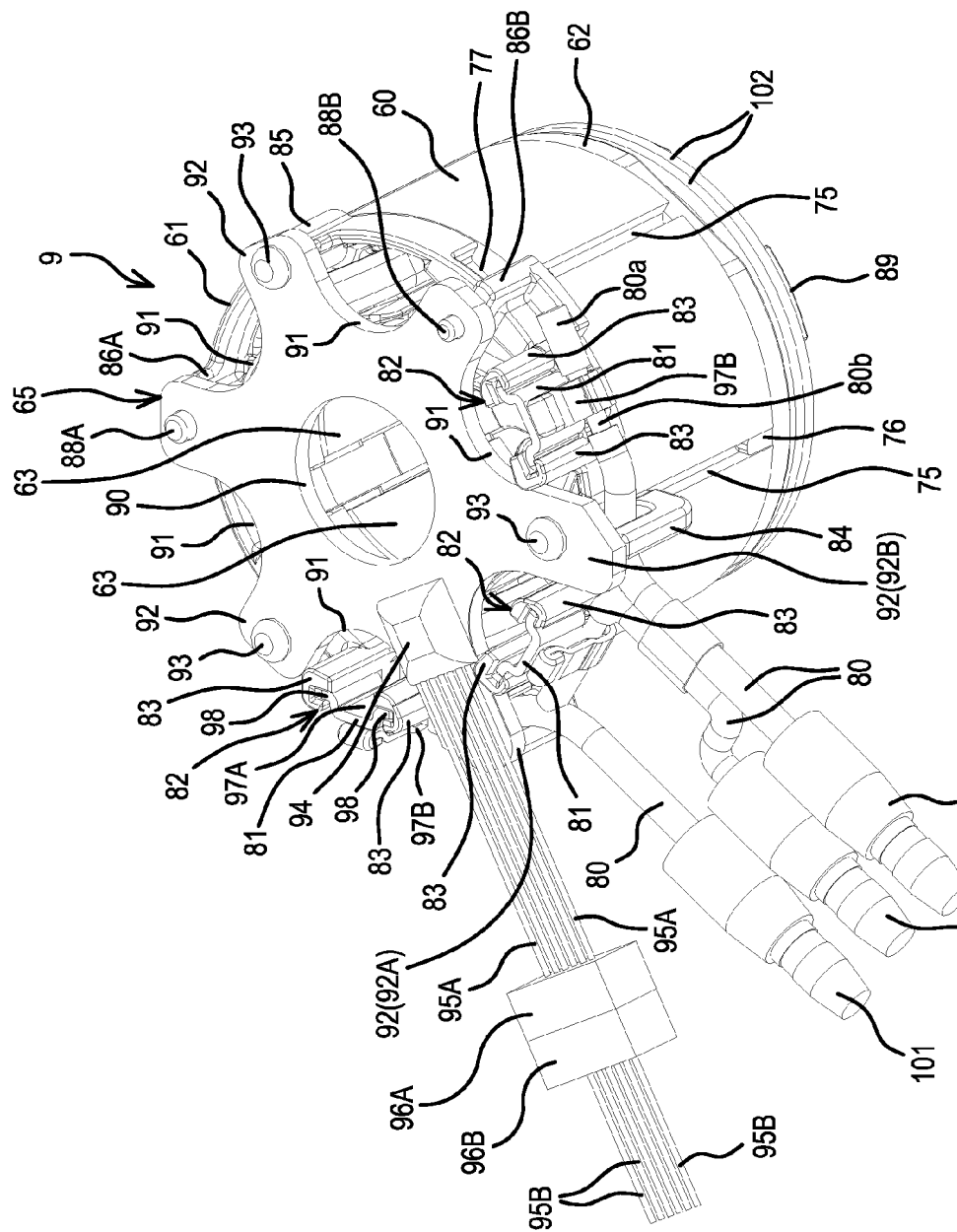
FIG. 5 is an oblique view of a stator of the hammer driver-drill of FIG. 1.
Figure 6:
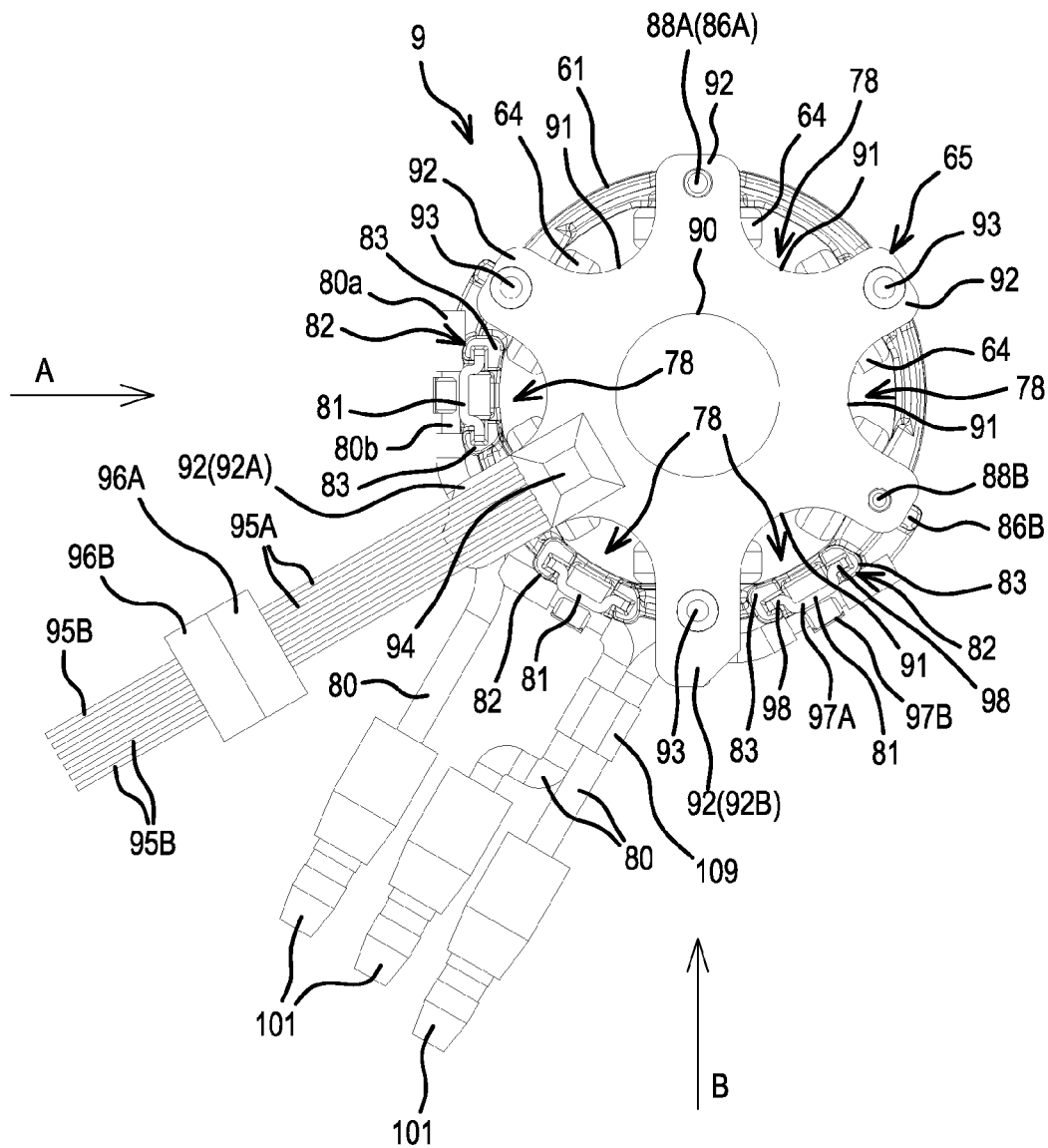
FIG. 6 is a plan view of the stator of FIG. 5.

FIG. 1 is a side view of a representative hammer driver-drill 1, which serves as one non-limiting embodiment of a power tool according to the present teachings, FIG. 2 is a rear view thereof, FIG. 3 is a longitudinal, cross-sectional view thereof, and FIG. 4 is an enlarged cross-sectional view of a main-body portion thereof. The hammer driver-drill 1 includes a handle 3 that protrudes downward from a main body 2 extending in a front-rear direction. A drill chuck 4, which serves as a tool-accessory retaining part and is configured or adapted to grasp at its tip a bit, is provided on a front end of the main body 2. A battery pack 5 serving as a power supply is detachably mounted on a lower end of the handle 3. A housing 6 is formed by joining (assembling), using screws 7 extending in the left-right direction, left and right half housings 6a, 6b, which continuously form the handle 3 and a rear-half portion of the main body 2.

A rear portion within the main body 2 houses an inner-rotor type brushless motor 8 that comprises a rotor 10 rotatably disposed in the interior of a tubular stator 9. The rotor 10 comprises a rotary shaft 11. A gear assembly 12 comprises a spindle 13 that protrudes forward from the housing 6. The gear assembly 12 is located (assembled) forward of the brushless motor 8 and serves to convert the rotation of the rotary shaft 11 into a lower rotational speed that is transmitted to the spindle 13. The drill chuck 4 is attached to a front end of the spindle 13. Below the main body 2, a switch 14 is housed in an upper part of the handle 3, and a trigger 15 protrudes forward. A motor forward/reverse-changing button (reversing switch lever) 16 is provided upward of the switch 14, and forward thereof an LED 17 that illuminates forward of the drill chuck 4 is housed in a diagonally upward orientation.

A mounting part 18, onto which the battery pack 5 is slidably mounted from the front, is formed on a lower end of the handle 3. The mounting part 18 houses: a terminal block 19, which comprises terminals 19a to which the battery pack 5 is electrically connected, and a controller 20, which comprises a microcontroller that controls the brushless motor 8, six switching devices, etc., and whereto the switch 14, the stator 9 of the brushless motor 8, and the like are electrically connected. A strap-anchoring part 21 is provided on a rear surface of the mounting part 18 using a screw boss, and reference numbers 22 are hook-attachment parts for hanging the power tool on a tool belt when not in use. The battery pack 5 further includes a rechargeable battery 23 (herein, a 10.8 V rechargeable battery provided with three (lithium ion) battery cells), terminals 24, and a locking (latching) hook 25. The hook 25 can be released from a corresponding latching part provided on the mounting part 18 by pushing down a button 26 located on a front surface of the battery pack 5.

The gear assembly 12 includes a tubular first gear case 27, which is located forward of the brushless motor 8, and a second gear case 28, which is affixed forward of the first gear case 27 and has a two-step tubular shape, i.e. a large-diameter part 29 and a small-diameter part 30. The first gear case 27 supports the rotary shaft 11 via a bearing 31, and a tip of the rotary shaft 11, to which a pinion 32 is attached, protrudes into the gear assembly 12.

A planetary-gear, speed-reducing mechanism 33 includes three stages of carriers 35A-35C, which respectively support a plurality of planet gears 36A-36C respectively revolving inside internal gears 34A-34C, disposed in an axial direction. The speed-reducing mechanism 33 is housed in an interior of the gear assembly 12, and the pinion 32 of the rotary shaft 11 meshes with the first-stage planet gear 36A. The second-stage internal gear 34B is rotatable and moveable frontward and rearward in the axial direction; furthermore, at an advanced position, the second-stage internal gear 34B is capable of meshing with a coupling ring 37, which is held inside the large-diameter part 29.

A speed change lever 39, which is provided in the housing 6 such that it is capable of sliding frontward and rearward, is coupled to the internal gear 34B via a linking member 38. When the speed change lever 39 is slid rearward, the internal gear 34B retracts via the linking member 38 and meshes with an outer circumference of the first-stage carrier 35A while maintaining the meshing with the second-stage planet gear 36B. In this rearward position of the speed change lever 39, a high-speed mode results wherein the second-stage deceleration is omitted (cancelled). Conversely, when the speed change lever 39 is slid forward, the internal gear 34B advances, separating from the carrier 35A, via the linking member 38, and meshes with the coupling ring 37 while maintaining the meshing with the second-stage planet gear 36B, and thereby rotation is inhibited. In this forward position of the speed change lever 39, a low-speed mode results wherein the second-stage deceleration functions.

A hammer (percussion) mechanism that imparts hammering (percussion) to the spindle 13 in the axial direction is provided on an inner side of the small-diameter part 30 of the second gear case 28. Furthermore, a clutch mechanism, which cuts off the transmission of torque to the spindle 13 at a prescribed load on the spindle 13, is provided on an outer side of the small-diameter part 30. This design provides three switchable operating modes, namely (i) a hammer-drill mode, in which the spindle 13 is hammered while it rotates, (ii) a drilling mode, in which the spindle 13 only rotates without being hammered, and (iii) a clutch mode (driving mode), in which the transmission of torque to the spindle 13 is cut off at a prescribed load. Each of the operating modes and mechanisms will be further explained in the following.

In the hammer mechanism, the spindle 13 is axially supported by front and rear bearings 40, 41 inside the small-diameter part 30, and a rear end of the spindle 13 is slidably coupled to the third-stage carrier 35C. Between the bearings 40, 41 in the spindle 13, a ring-shaped first cam 42 and a ring-shaped second cam 43 are externally mounted coaxially from the front. The first cam 42 has a cam gear on its rear surface and is coupled to the spindle 13 via a spline. A cam gear is formed on the front surface of the second cam 43, and the spindle 13 is loosely inserted into the second cam 43, which is non-rotatably disposed inside the small-diameter part 30.

Furthermore, forward of the first cam 42, a plurality of steel balls 45 is held by a ring-shaped receiving plate 44 between the first cam 42 and the bearing 40, and a cam plate 46 is provided between the steel balls 45 and the first cam 42. An arm 47 extends rearward from the cam plate 46. The arm 47 is linked via a linking plate 49 to a mode-changing ring 48, which is rotatably joined (assembled) to the large-diameter part 29 and is forward of the housing 6. When the linking plate 49 is rotated as a result of a manual rotation of the mode-changing ring 48, the first cam 42 is slid rearward via the cam plate 46 and is caused to mesh with the second cam 43.

In the clutch mechanism, a clutch ring 50 is externally mounted rotatably to the small-diameter part 30 forward of the mode-changing ring 48. On an inner side of the clutch ring 50, a screw-feeding plate 51, which screws onto a screw part formed on an outer circumference of the small-diameter part 30, is provided integrally rotatable with the clutch ring 50 and moveable in the axial direction. Rearward of the screw-feeding plate 51, a front receiving plate 52 capable of forward-rearward movement in the axial direction is provided on the small-diameter part 30 in a state wherein the rotation of the front receiving plate 52 is restricted. A pressing plate 54, which makes contact with a front surface of a closure part 53 between the large-diameter part 29 and the small-diameter part 30, and a rear receiving plate 55, which is forward thereof, are provided rearward of the front receiving plate 52. Coil springs 56 are disposed, equispaced in a circumferential direction, between the front receiving plate 52 and the rear receiving plate 55.

In addition, rearward of the pressing plate 54, a plurality of steel balls 57, is held, such that the steel balls 57 are equispaced in the circumferential direction, by the closure part 53. The steel balls 57 contact a front surface of the third-stage internal gear 34C, which is rotatable, and are capable of engaging in a circumferential direction with a clutch cam, which is not shown, and is provided such that it protrudes from the front surface of the internal gear 34C. A biasing force of the coil springs 56 is transmitted to the internal gear 34C via the steel balls 57, the pressing plate 54, and the rear receiving plate 55, which causes the rotation of the internal gear 34C to be restricted or prevented. The clutch ring 50 is rotationally operated to screw-feed the screw-feeding plate 51 and the front receiving plate 52 in the axial direction so as to change the axial length of the coil springs 56, thereby making it possible to modify the pressing force imparted (applied) to the internal gear 34C.

Each operation mode will now be explained in the following. First, at a first rotational position of the mode-changing ring 48, which is a phase (operation mode) in which the cam plate 46 does not slide the first cam 42 rearward, the first cam 42 is disposed forward of the second cam 43 and does not mesh with the second cam 43. Consequently, the rotational operation of the clutch ring 50 results in a clutch mode in which the pressing force imparted (applied) to the internal gear 34C is modifiable.

In this clutch mode, if the trigger 15 is squeezed to drive the brushless motor 8, then the rotary shaft 11 rotates and the spindle 13 rotates via the planetary-gear, speed-reducing mechanism 33, thereby making it possible to perform a screw tightening operation or the like with a driver bit mounted in the drill chuck 4. As the screw tightening progresses, the load imparted (applied) to the spindle 13 eventually exceeds the pressing force of the coil springs 56 that fix the internal gear 34C. When this happens, the clutch cam of the internal gear 34C pushes out the steel balls 57, the pressing plate 54, and the rear receiving plate 55 forward, the internal gear 34C is idled, and thus the screw tightening ends (clutch operation).

Next, at a second rotational position at which the mode-changing ring 48 has been rotated by a prescribed angle from the clutch mode, a restraining ring 58, which is provided on the mode-changing ring 48, engages with the rear receiving plate 55, thereby restricting the advance of the rear receiving plate 55. Consequently, the drilling mode results wherein the movement of the pressing plate 54 forward is continuously restricted (prevented) regardless of the pressing force of the coil springs 56.

If the spindle 13 is rotated in the drilling mode, then, regardless of the load imparted (applied) to the spindle 13, the steel balls 57 do not ride over the clutch cam of the internal gear 34C, and consequently the rotation of the spindle 13 continues while the fixed state of the internal gear 34C remains unchanged. Furthermore, at this time, too, the first cam 42 does not slide rearward, and consequently hammering (percussion) on the spindle 13 does not occur.

Furthermore, at a third rotational position at which the mode-changing ring 48 has been further rotated by a prescribed angle from that of the drilling mode, the cam plate 46 slides the first cam 42 rearward. However, the engagement of the restraining ring 58 and the rear receiving plate 55 does not change. Consequently, a hammer mode results wherein the first cam 42 and the second cam 43 engage.

When the spindle 13 is rotated in the hammer mode, the first cam 42, which rotates integrally with the spindle 13, engages with the second cam 43 fixed inside the small-diameter part 30, and consequently hammering (percussion) on the spindle 13 occurs. Furthermore, because the fixed state of the pressing plate 54 does not change owing to the restraining ring 58, the rotation of the spindle 13 continues regardless of the load imparted (applied) to the spindle 13.

Turning now to the details of the motor 8, the stator 9 of the three-phase brushless motor 8 is held, with the front-rear direction serving as the axis, by ribs 59 formed on inner surfaces of the half housings 6a, 6b. In the stator 9, a ring-shaped front insulator 61 and a ring-shaped rear insulator 62, which are electrically insulating members, are assembled (joined) onto front and rear end surfaces of a stator core 60, which is formed by laminating (stacking) a plurality of steel plates. In addition, coils 64 are respectively wound around six teeth 63 that protrude from an inner side of the stator core 60. Further, a sensor circuit board 65 is provided on which magnetic sensors 66, such as Hall-effect ICs, are installed (mounted). The magnetic sensors 66 detect the (rotational) positions of permanent magnets 68 provided on the rotor 10. The sensor-circuit board 65 is screw fastened onto a front surface of the front insulator 61.

Optionally, the sensor circuit board 65 may include a temperature-detecting device that generates a temperature-detection signal, which is then input to the controller 20. In such an embodiment, the controller 20 monitors the temperature-detection signal and stops the control (operation) of the brushless motor 8 at a prescribed temperature. In such an embodiment, damage caused by an excessive temperature of the brushless motor 8 of the 10.8 V hammer driver-drill 1 can be reliably prevented.

Referring again to FIGS. 3 and 4, the rotor 10 comprises: a substantially cylindrical rotor core 67, which is formed by laminating (stacking) a plurality of steel plates and is disposed around the rotary shaft 11. Four plate-shaped permanent magnets 68 (e.g., sintered magnets) are fixed to an inner part of the rotor core 67. The permanent magnets 68 are inserted into through holes, which are formed such that they are located, in a transverse cross section of the rotor core 67, on four sides of a square centered on the rotary shaft 11, and are fixed by an adhesive and/or by press fitting. A rear end of the rotary shaft 11 is axially supported by a bearing 69, which is held by a rear part of the housing 6, and a centrifugal fan 70 is attached forward of the bearing 69. Air-exhaust ports 71, which are formed in left and right side surfaces of the housing 6 proximal to the location of the centrifugal fan 70, and air-suction ports 72 are provided in side surfaces of the housing 6 that contact outer sides of the stator 9 (see FIG. 1).

A rear stopper 73 is provided between the rotor core 67 and the centrifugal fan 70. The rear stopper 73 is a brass disc and has an outer diameter the same as that of the rotor core 67; it is fastened to the rotary shaft 11 coaxially with the rotor core 67. A front stopper 74 is provided on an inner side of the sensor circuit board 65 between the rotor core 67 and the bearing 31 on the front side. The front stopper 74 is also a brass disc, but has an outer diameter smaller than that of the rotor core 67; it is fastened to the rotary shaft 11 coaxially with the rotor core 67 and such that the front stopper 74 is spaced apart from the rotor core 67 with a gap in between. However, the outer diameter of the front stopper 74 is larger than that of an inner-side circle virtually defined by the positions of the four permanent magnets 68. Furthermore, the front stopper 74 is located forward of the permanent magnets 68.

The structure of the stator 9 will now be discussed in further detail, with reference to FIGS. 5-9. However, the stator 9 is shown in FIG. 5 to FIG. 8 removed from the power tool and will be explained with the understanding that the front insulator 61 side is set upward and the rear insulator 62 side is set downward.

Six grooves 75 are hollows (recesses) formed in the axial direction and equispaced in the circumferential direction along extensions of the teeth 63 on an outer circumference of the stator core 60. Mating pieces 76 are formed integrally with or on each of the front insulator 61 and the rear insulator 62 in the axial direction. The mating pieces 76 respectively mate with (are press-fitted into) end portions of the grooves 75. The press fitting of the mating pieces 76 into the grooves 75 makes it possible to resist warpage of the front and rear insulators 61, 62 and to rigidly integrate (connect) the stator core 60 with the front and rear insulators 61, 62.

In addition, a side surface of the front insulator 61 includes a latching recessed part (recess) 77 to which a projection (not shown) on the inner surface of the housing 6 is latched (engaged). This make it possible to rotationally lock the stator 9 and to position the stator 9 in the front-rear direction.

On the outer sides of three of the slots 78, which are adjacent in a semicircular portion of the front insulator 61, three upward-protruding retaining parts 82 are provided to respectively hold three fusing terminals 81. Each fusing terminal 81 electrically connects (fuses) a wire 79 of two of the coils 64 for one phase with a respective power-supply line 80 for the corresponding phase. In each retaining part 82, a pair of projections 83—each projection 83 forming a U shape in plan view—is sequentially arranged in a circumferential direction of the front insulator 61 such that the projections 83 are oriented opposing one another and are provided such that they protrude to a height that protrudes farther upward than a ring-shaped upper-end surface 61a of the front insulator 61. Between three of the retaining parts 82, L-shaped (in side view) hooks 84 for holding the power-supply lines 80 are provided such that they protrude from the outer sides of the teeth 63. Two of the three power-supply lines 80 are bundled by tape 109 at a location near the stator 9.

In addition, on the outer side of the tooth 63 that is located between the retaining parts 82 and on the outer sides of the two teeth 63 that are located two teeth away from said tooth 63 in the circumferential directions (i.e., at vertex positions of a regular triangle), three screw bosses 85 for screw fastening the sensor circuit board 65 are provided such that they are lower than the retaining parts 82 and protrude to a height that protrudes farther upward than the upper-end surface 61a of the front insulator 61. Stepped bosses 86A, 86B, which have receiving surfaces 87 of a height the same as that of the screw bosses 85 and wherein are provided bosses 88A, 88B that protrude farther upward than the receiving surfaces 87, are provided such that they protrude from the outer sides of the teeth 63 located between the screw bosses 85. The boss 88A of the stepped boss 86A is disposed along a concentric circle that is slightly smaller than the concentric circle of the screw bosses 85, and the diameter of the boss 88B is smaller than that of the boss 88A.

On the rear insulator 62, guide ribs 89 are disposed along the circumferential direction and are uprightly provided concentrically on the outer sides of the slots 78.

In the sensor circuit board 65, six notched parts (notches) 91, which are curved toward a through hole 90 for the rotary shaft 11 provided at the center of the sensor-circuit board 65, are formed equispaced in the circumferential direction. Six fixing pieces 92, which protrude in radial directions, are formed equispaced in the circumferential direction. Each fixing piece 92 is formed between a circumferentially-adjacent pair of notched parts 91. Furthermore, each notched part 91 extends beyond an inner circumference of the stator core 60 and curves to a location that overlaps its corresponding slot 78 in plan view. In addition, a tip of each fixing piece 92 extends slightly beyond an outer circumference of the stator core 60. Two adjacent fixing pieces 92 (hereinbelow indicated as 92A, 92B when they are distinguished) are formed longer than the other four fixing pieces 92.

Three fixing pieces 92 that are located at the vertexes of the regular triangle, which includes the long fixing piece 92B, are each fixed by screws 93 to the screw bosses 85 located along the extensions of the teeth 63. The bosses 88A, 88B of the stepped bosses 86A, 86B are inserted into the remaining three fixing pieces 92. A connection part 94 of six lead wires 95A, which lead wires output detection signals generated by the three magnetic sensors 66, is provided on an upper surface of the long fixing piece 92A. A connector 96A is provided at the tips of the lead wires 95A, and the lead wires 95A, 95B are connected together by the connector 96A and a connector 96B provided on the lead wires 95B leading out from the controller 20.

Figure 9:
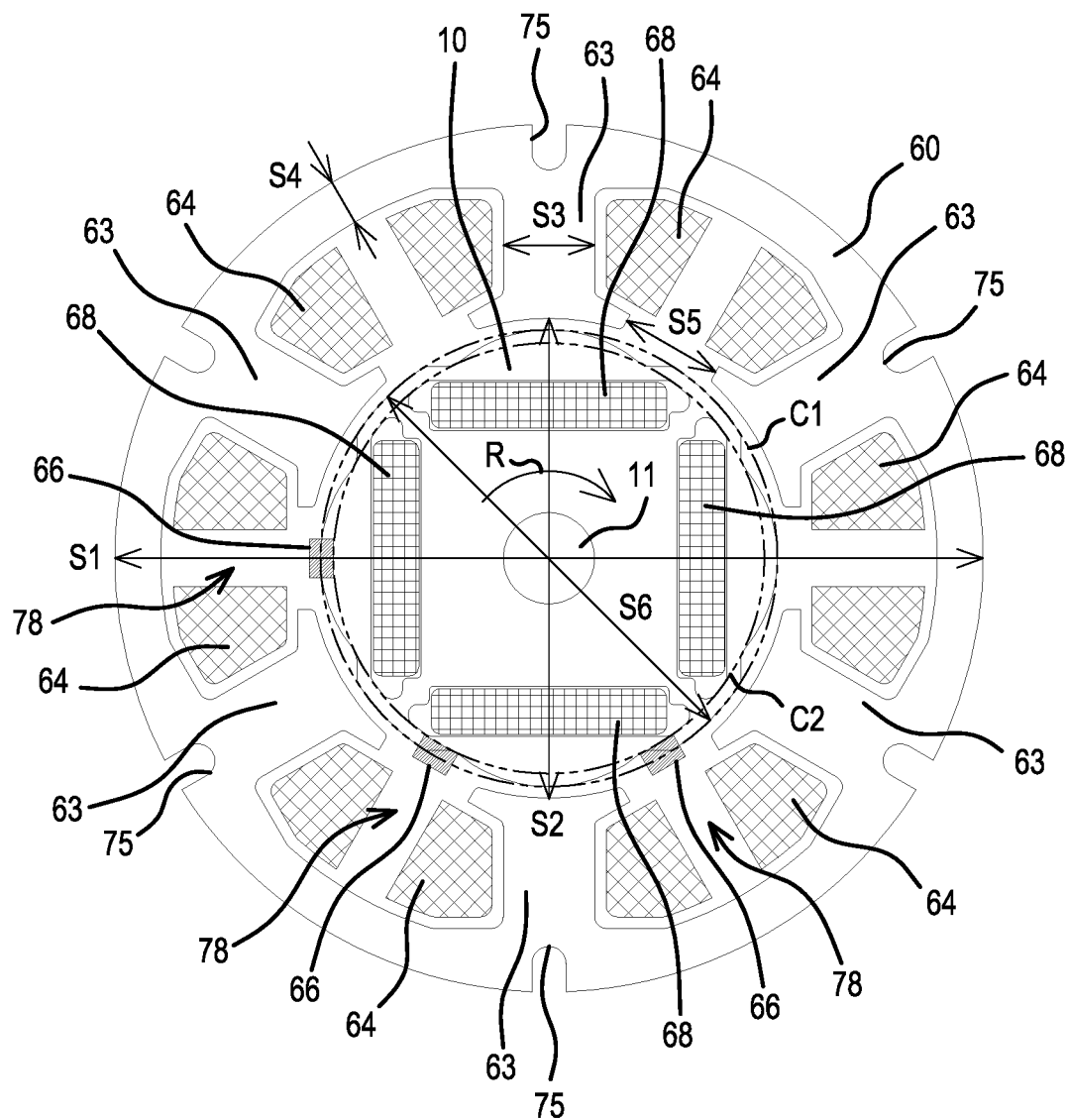
FIG. 9 is a transverse, cross-sectional schematic drawing of the stator of FIG. 5.

The three magnetic sensors 66 are disposed on a lower surface of the sensor circuit board 65 at prescribed spacings around the through hole 90. As shown in FIG. 9, the three magnetic sensors 66 are disposed, in a rotational direction indicated by arrow R, such that they are located at the centers of the slots 78 in the circumferential direction. In other words, they are located at locations shifted by 30° from centerlines of the teeth 63. The magnetic sensors 66 are also located along the circumference of a first circle C1 and outside of a second circle C2. The transverse cross-sectional outer shape of the rotor 10 is noncircular. The first circle C1 represents the larger width of the rotor 10 and the second circle C2 represents the smaller width of the rotor 10.

In FIG. 9, a stator outer diameter S1 is 38 mm, a stator inner diameter S2 is 21 mm, a tooth width S3 is 4.0 mm, a back-yoke width S4 is 2.0 mm, a slot-opening width S5 is 4.5 mm, and a rotor outer diameter S6 is 20 mm.

Furthermore, the stator inner diameter S2 can be modified within the range of 20-22 mm (a ratio of 0.53-0.58 for the case wherein the stator outer diameter is set to 1), the tooth width S3 can be modified within the range of 4.0-4.4 mm (a ratio of 0.11-0.12 for the same case), the back-yoke width S4 can be modified within the range of 2.0-2.2 mm (a ratio of 0.05-0.06 for the same case), the slot-opening width S5 can be modified within the range of 2.5-4.5 mm (a ratio of 0.07-0.12 for the same case), and the rotor outer diameter S6 can be modified within the range of 19-21 mm (a ratio of 0.50-0.55 for the same case). Thus, if the magnetic path of an interior permanent magnet type (IPM-type) rotor is designed based on the stator outer diameter, the power density can be increased. Furthermore, even if the battery voltage is 10.8 V or the stator outer diameter is less than 40 mm, the rotational speed of the rotor can be increased to 24,000 rpm or greater. Moreover, if the battery voltage is 14.4 V, 18 V, or 36 V, it is possible to achieve a high rotational speed of 30,000-40,000 rpm.

Figure 10:
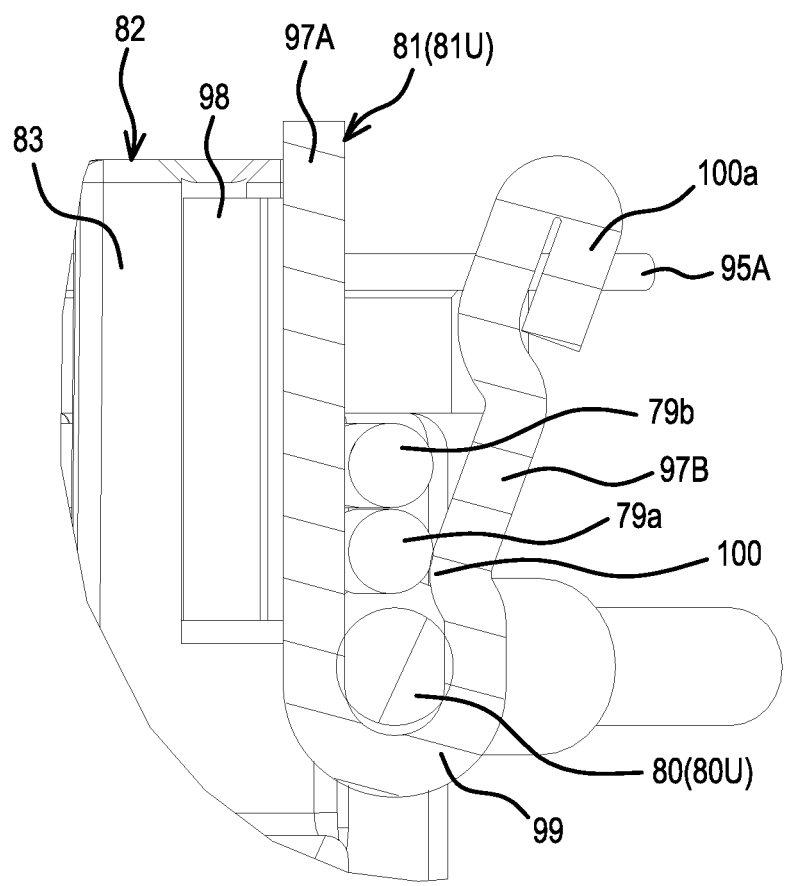
FIG. 10 is an enlarged view of a fusing portion mountable on the stator of FIG. 5.

Each fusing terminal 81 is made by folding a strip-shaped metal plate in two, thereby forming L-shaped wing pieces 98 on both sides of one plate part 97A. Then, a tip of another plate part 97B is folded back toward the outer side. With the double-folded portion set downward, the wing pieces 98 are inserted, from above, into both projections 83 of the corresponding retaining part 82, and thereby the fusing terminal 81 is held with an attitude such that the plate part 97B is located on the outer side and a V shape is open upward, as shown in FIG. 10. Here, a curled part 99, in which the power-supply lines 80 fit, is formed on an inner side of the double-folded portion; on an upper side thereof, a bent part 100 is formed wherein the wire 79 of the coils 64 is pinched by the plate part 97B. Element 100a is a folded-back part of the plate part 97B. Thus, the fusing terminals 81 are disposed such that they are gathered, by the retaining parts 82, on one semicircular side of the stator 9 in plan view.

For each power-supply line 80, only a portion 80b of a stranded wire, i.e. the portion that is to be fused to its corresponding fusing terminal 81, is stripped, leaving behind a tip 80a made of an insulative covering. Thus, by leaving the tip 80a, the stripped (exposed) portion 80b of the stranded wire does not unravel. In addition or in the alternative to leaving the tip 80a made of the insulative covering, the stranded wire may be prevented from unraveling by, for example: (i) covering the tip of the stranded wire with a heat-shrink tube, (ii) crimping the tip of the stranded wire with a splice terminal, (iii) soldering or welding the tip of the stranded wire, or (iv) fortifying or impregnating the tip of the stranded wire with a thermosetting resin.

In addition, bullet terminals 101 are provided at the tips of the power-supply lines 80 that lead out from the stator 9, and the power-supply lines 80 are electrically connected to one another by coupling the (e.g., male) bullet terminals 101 with complementary (e.g., female) bullet terminals (not shown) provided on power-supply lines (not shown) that lead out from the controller 20.

In the present embodiment, the six coils 64 are formed by sequentially winding one (i.e. a single continuous) wire 79 around every tooth 63, and then two coils 64 of each phase are connected to their respective fusing terminal 81. Furthermore, crossover wires 102 (i.e. crossover wires 102U, 102V, 102W), each of which interconnects the coils 64 of one phase that are located diagonally opposite one another, are wired (disposed) on the rear insulator 62 side and not on the front insulator 61 side. Various methods of winding the coils 64 are explained below, wherein, if there is a need to distinguish the three phases of U, V, and W, then the letters U, V, and W are appended to the reference numbers of the constituent parts. Furthermore, the numerals 63, 64 and the like are further appended if the teeth 63, the coils 64, and the like, which form pairs for each phase, are distinguished, for example, as in 63U1, 63U2, 64U1, 64U2.

Figure 11:
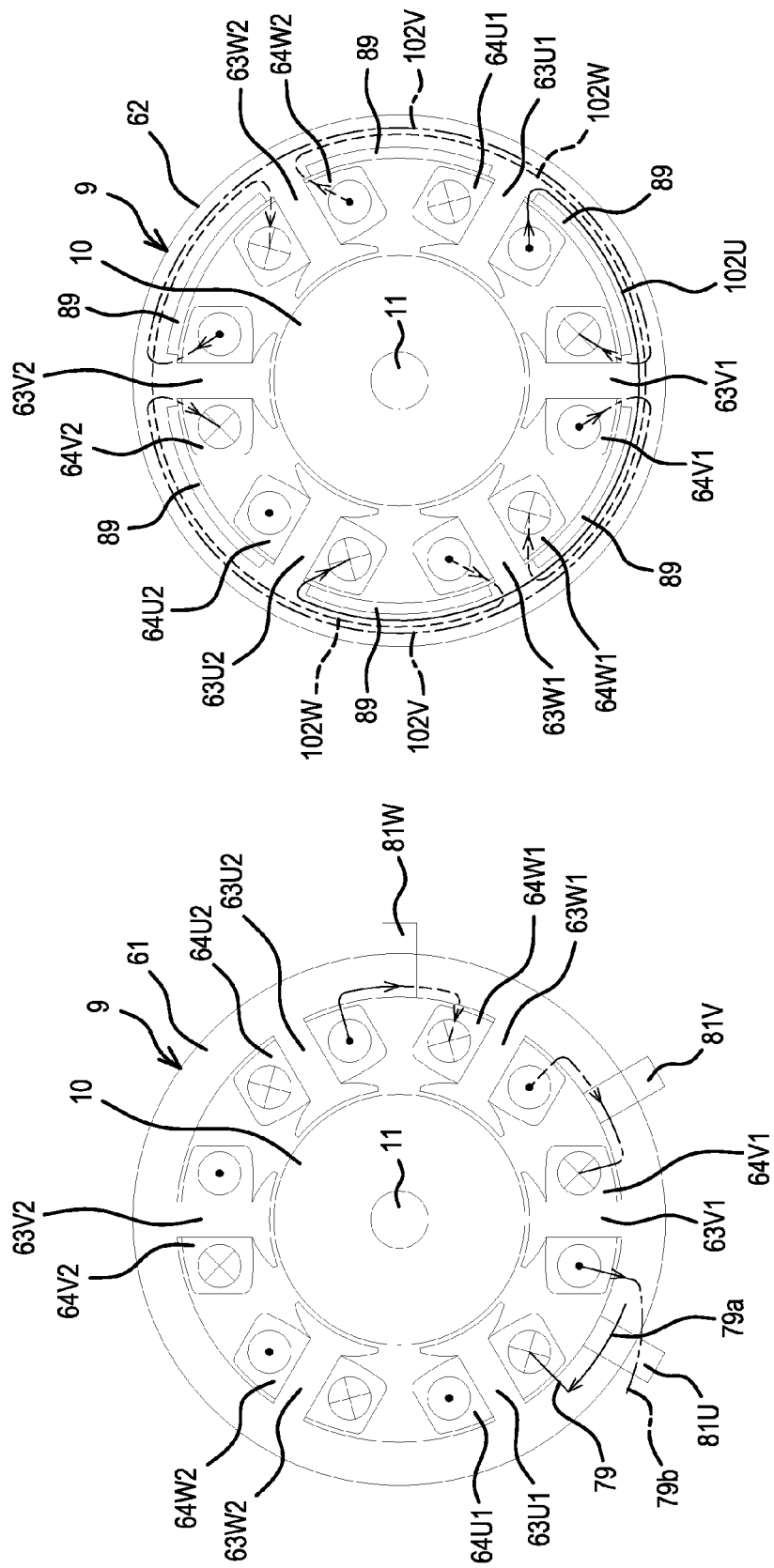
FIGS. 11A and 11B schematically show a wire winding method from a wiring-connection side in FIG. 11A and from opposite the wiring-connection side in FIG. 11B.

FIG. 11 is a schematic drawing that shows a winding method, wherein FIG. 11A is the wiring-connection side (the front insulator 61 side) and FIG. 11B is the opposite wiring-connection side (the rear insulator 62 side). Reference numbers 81U, 81V, 81W are the fusing terminals. The circled-plus symbols indicate wires wound on the far side orthogonal to the paper surface, and the circled black-dot symbols indicate wires wound on the near side orthogonal to the paper surface. In addition, the following explanations of the wiring-connection side and the opposite wiring-connection side assumes that the counterclockwise direction is left and the clockwise direction is right.

As used herein, the term "winding direction" is intended to mean the circumferential direction that the wire 79 moves when it first traverses one of the teeth 63. Thus, for example, with reference to FIG. 11A, the wire 79 leading from the fusing terminal 81U travels into the page at the circled-plus side of the tooth 63U1 and moves clockwise before emerging from the page at the circled black-dot side of the tooth 63U1. The wire 79 is therefore said to be wound around the tooth 63U1 in the clockwise direction. Further details related to the winding of the wire 79 are provided below. Furthermore, a wire wound "clockwise" when viewed from the wiring connection side is thus counterclockwise when viewed from the opposite wiring-connection side. When the winding directions of two wires are compared, however, the comparison is made from the same side, e.g., from the wiring-connection side.

First, a start end 79a of the wire 79 is temporarily fixed, on the wiring-connection side, to the fusing terminal 81U, whereto a U-phase power-supply line 80U has been temporarily fixed. Then, the coil 64U1 is formed by winding from the right side around the tooth 63U1, which is located on the left side of the fusing terminal 81U, and then led out, on the opposite wiring-connection side, on the left side of the tooth 63U1. A crossover wire 102U, which is shown by a solid-lined arrow, is pulled clockwise around on the outer sides of the guide ribs 89 as a substantially semicircular portion, after which the coil 64U2 is formed by winding from the right side around the diagonally-opposite tooth 63U2. Furthermore, the wire 79 is led out, on the wiring-connection side, from the left side of the tooth 63U2 and is temporarily fixed to the fusing terminal 81W, whereto a W-phase power-supply line 80W has been temporarily fixed.

Next, a coil 64W1 is formed by winding from the right side around a tooth 63W1, which is adjacent to the left side of the fusing terminal 81W. Then, it is led out, on the opposite wiring-connection side, on the left side of the tooth 63W1. A crossover wire 102W, which is shown by a dotted line, is pulled clockwise around on the outer sides of the guide ribs 89 as a substantially semicircular portion, after which a coil 64W2 is formed by winding from the right side around the diagonally-opposite tooth 63W2. Subsequently, it is led out, on the same opposite wiring-connection side, on the left side of the tooth 63W2, the crossover wire 102W is pulled clockwise around on the outer sides of the guide ribs 89 as a substantially semicircular portion, and then led out, on the wiring-connection side, on the left side of the diagonally opposite tooth 63W1 and is temporarily fixed to the fusing terminal 81V, whereto the V-phase power-supply line 80V has been temporarily fixed. That is, the wire 79 that forms the W-phase coils 64W1, 64W2 is wired, a substantially semicircular portion at a time, on the rear insulator 62 side clockwise between the diagonally opposite teeth 63W1, 63W2.

Figure 7:
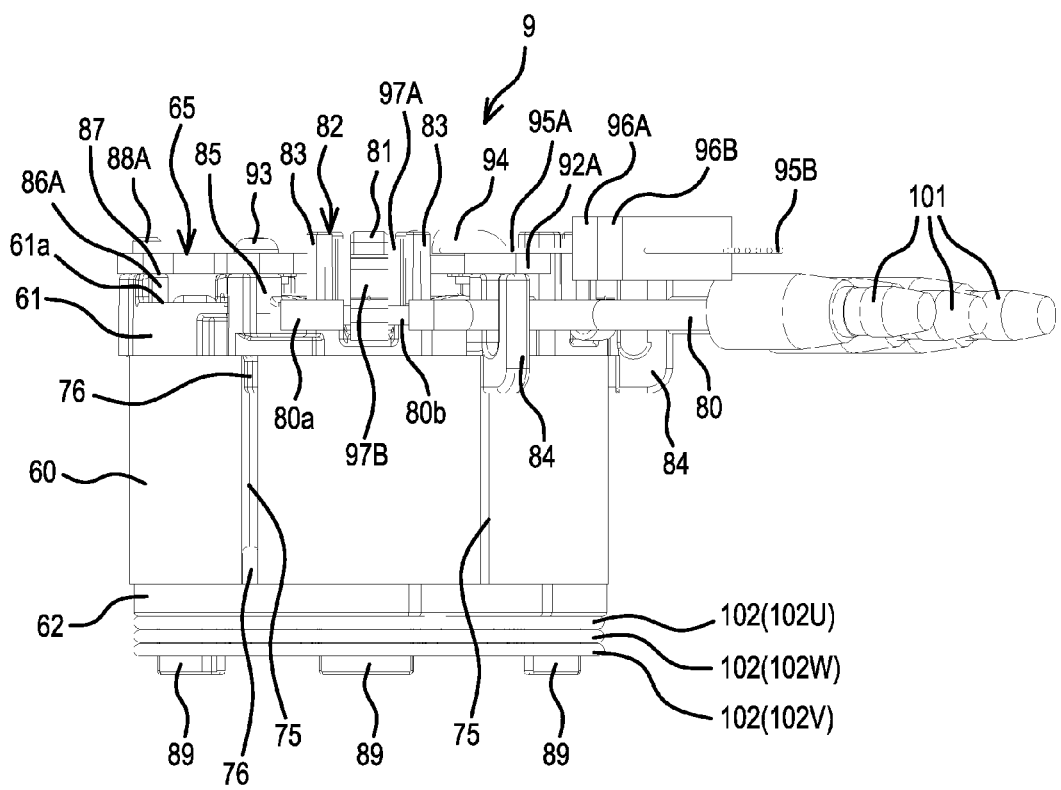
FIG. 7 is a side elevational view in the direction of arrow A in FIG. 6.
Figure 8:
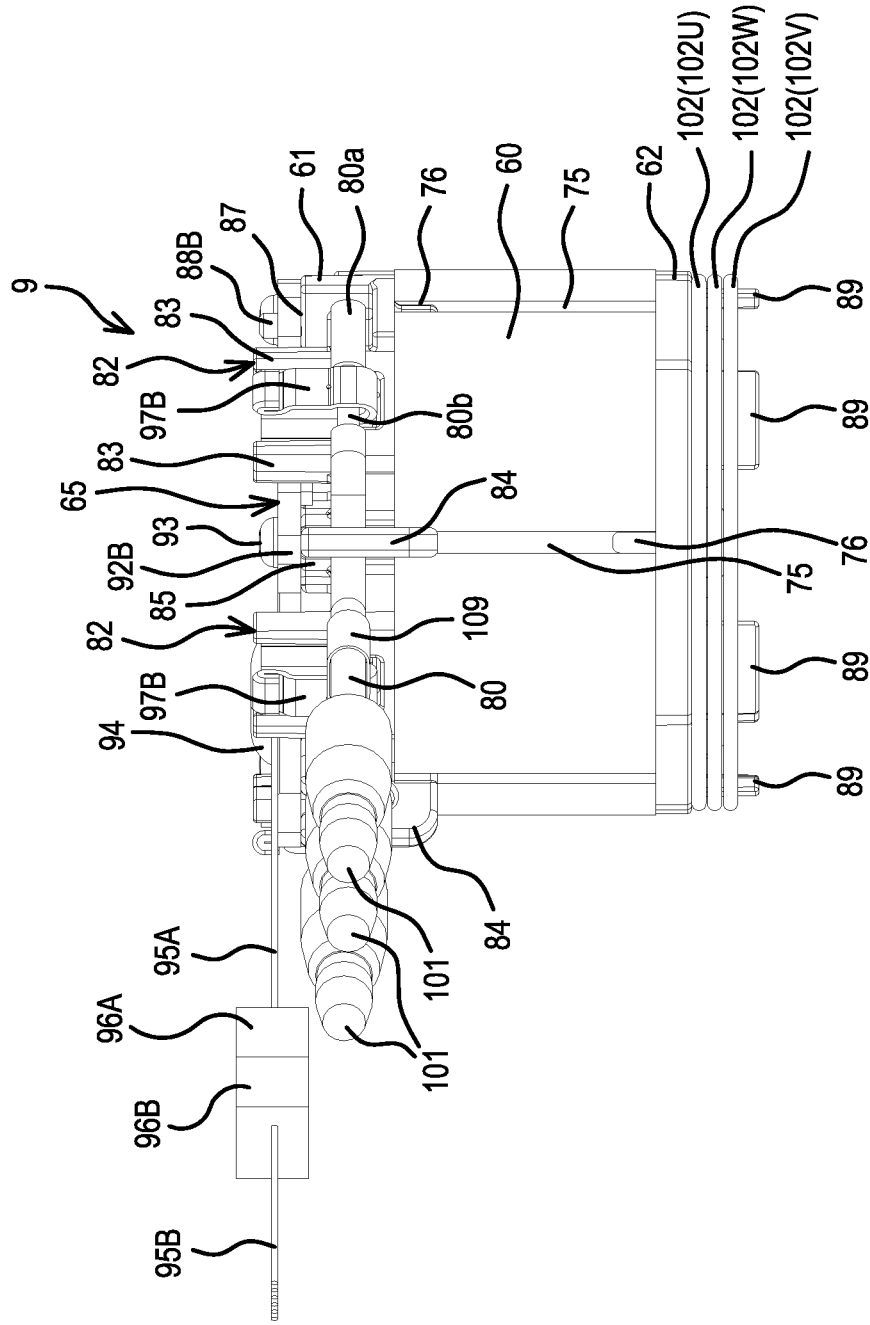
FIG. 8 is a side elevational view in the direction of arrow B in FIG. 6.

Next, a coil 64V1 is formed by winding from the right side around a tooth 63V1, which is adjacent to the left side of the fusing terminal 81V. Then it is led out, on the opposite wiring-connection side, on the left side of the tooth 63V1. A crossover wire 102V, which is shown by a chain line, is pulled clockwise around on the outer sides of the guide ribs 89 as a substantially semicircular portion, after which the coil 64V2 is formed by winding from the right side around the diagonally-opposite tooth 63V2. Subsequently, it is led out, on the same opposite wiring-connection side, on the left side of the tooth 63V2, the crossover wire 102V is pulled clockwise around on the outer sides of the guide ribs 89 as a substantially semicircular portion and is subsequently led out, on the wiring-connection side, on the left side of the diagonally-opposite tooth 63V1, and a terminal end 79b is temporarily fixed to the fusing terminal 81U, which is adjacent to the left side of the tooth 63V1. That is, the wire 79 that forms the V-phase coils 64V1, 64V2 also is wired, a substantially semicircular portion at a time, on the rear insulator 62 side counterclockwise between the diagonally-opposite teeth 63V1, 63V2. In actuality, as shown in FIGS. 7, 8, the crossover wires 102 are wired such that they overlap in the axial direction on the outer sides of the guide ribs 89.

Figure 12:
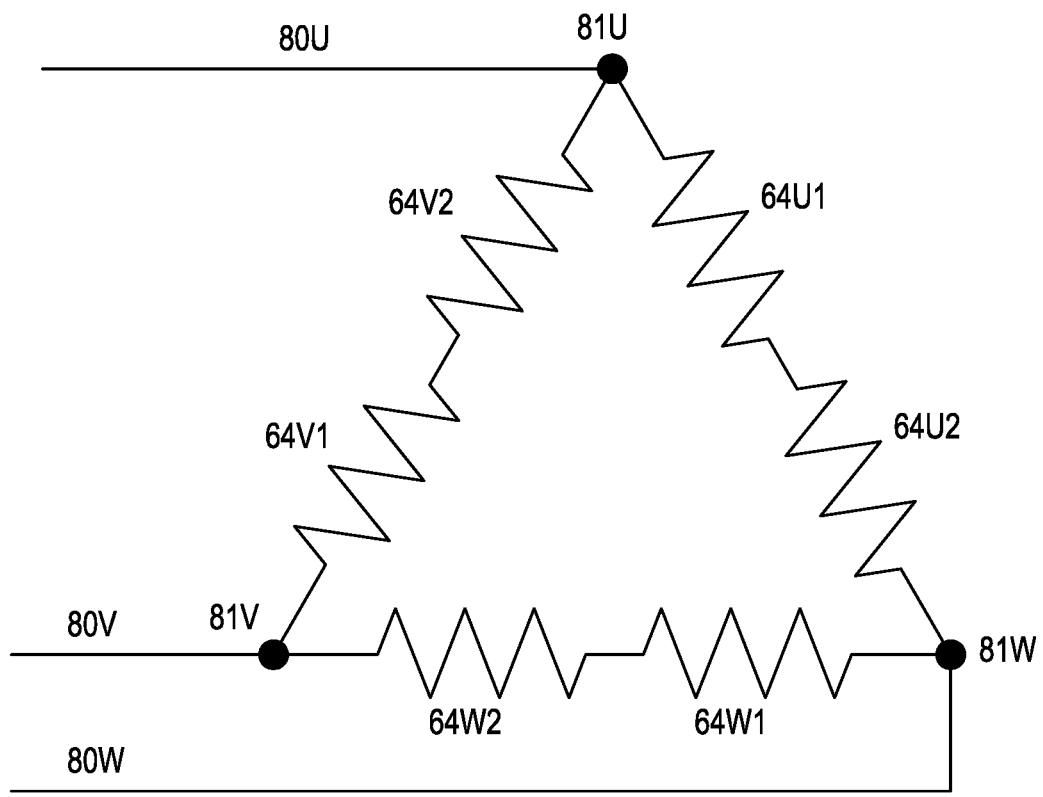
FIG. 12 is a circuit diagram schematically depicting a coil wiring arrangement.

Lastly, if the power-supply lines 80 and the wire 79 are fused at each of the fusing terminals 81, then the stator 9 is obtained wherein the coils 64 of all phases are delta-connected in series, as shown in FIG. 12.

After the wiring connection has been completed in this manner, the sensor circuit board 65 is attached to the stator 9 and is supported by the upper surfaces of the screw bosses 85 and the receiving surfaces 87 of the stepped bosses 86A, 86B such that the sensor circuit board 65 is orthogonal to the axis line of the stator 9 and is located at a position above the upper-end surface 61a of the front insulator 61. At this time, the tips of the hooks 84, too, make contact with the lower surfaces of the long fixing pieces 92A, 92B, thereby supporting the fixing pieces 92A, 92B. In this embodiment, the crossover wires 102 between the coils 64 of each phase are wired on the opposite wiring-connection side, and therefore a sufficient gap is formed (provided) between the front insulator 61 and the sensor circuit board 65. In addition, in the state wherein the sensor circuit board 65 is fixed, the retaining parts 82 and fusing terminals 81 pass through the notched parts (notches) 91 of the sensor circuit board 65 and protrude upward from the sensor circuit board 65. Furthermore, the slots 78 between each of the teeth 63 in plan view are exposed to the interiors of the notched parts (notches) 91 of the sensor circuit board 65 (see e.g., FIG. 6).

Because the power-supply lines 80 are held by the hooks 84 and the fixing pieces 92, the power-supply lines 80 tend not to move and also become guides during the wiring. In addition, because the fixing piece 92A, to which the lead wires 95A of the magnetic sensors 66 are connected, is supported by the hooks 84, the lead wires 95A tend not to disconnect. Furthermore, because the distance in a radial direction from an axial center of the brushless motor 8 to the center of the boss 88A is smaller than the distance in the radial direction from that axial center to the centers of the screws 93, vibration of the sensor circuit board 65 during operation is inhibited.

Furthermore, because the sensor circuit board 65 is attached by the screws 93, if one of the sensor circuit board 65 or the stator 9 fails (becomes inoperative), the sensor circuit board 65 can be removed and separately repaired.

In the stator 9, the fusing terminals 81 are incorporated into the housing 6 at phases located on a lower-half side of the stator 9. Consequently, the power-supply line 80 of each phase connected to its corresponding fusing terminal 81 is wired via the shortest distance to the controller 20 side without passing through the left and right outer sides of the stator 9. As a result, the size of the housing 6 does not increase in the radial direction, thereby making it possible to reduce the size of the housing 6 (make it more compact) and to make do with a short length of wiring. In addition, because the power-supply lines 80 and the lead wires 95A of the magnetic sensors 66 can be isolated from the controller 20 side by the connector 96A, the bullet terminals 101, etc., the stator 9 and the controller 20 can be separately repaired, replaced, or the like, thereby keeping maintenance costs down. Furthermore, it is also possible to use other terminals, connectors, or the like to connect the lead wires together or the power-supply lines together.

In the hammer driver-drill 1 configured as described above, when the switch 14 is turned ON by squeezing the trigger 15, the microcontroller of the controller 20 (i) acquires the rotational state of the rotor 10 by receiving rotation-detection signals, which are output from the magnetic sensors 66 of the sensor circuit board 65 and which indicate the positions of the permanent magnets 68 of the rotor 10, (ii) controls the ON/OFF state of the switching devices in accordance with the acquired rotational state, and (iii) rotates the rotor 10 by sequentially supplying excitation current to the coils 64 of each phase of the stator 9. Consequently, the rotary shaft 11 rotates, which rotates the spindle 13 via the planetary-gear, speed-reducing mechanism 33; thus, usage in the operation mode selected for use with the tool accessory (tip tool) chucked (held) by the drill chuck 4 becomes possible.

Because the magnetic sensors 66 are disposed at the centers of the slots 78 of the stator 9, it is possible to perform advance-phase control in both the forward and reverse rotational directions. As a result, the timing of the energization, in which the excitation current is supplied from the controller 20 to the coils 64 of each phase, can be advanced by an advance angle of 30°. The location of the magnetic sensors 66 results in the sensor magnetic fluxes not being affected by the stator magnetic flux, and consequently the accuracy with which the rotational position of rotor 10 is sensed does not decrease.

When the centrifugal fan 70 rotates together with the rotation of the rotary shaft 11, outside air is sucked in via the air-suction ports 72 on the side surfaces of the housing 6, passes over the outer side of the stator 9 and the inner side of the stator 9 (between the stator 9 and the rotor 10), and is discharged via the air-exhaust ports 71, thereby cooling the brushless motor 8. As was described above, in the stator 9, the slots 78 are exposed, in a side view, by the notched parts (notches) 91 of the sensor circuit board 65. Furthermore, because the crossover wires 102 are not wired between the sensor circuit board 65 and the front insulator 61, the air that passes through the inner side of the stator 9 can pass smoothly through the slots 78 on both sides of the coils 64 without being hindered by the sensor circuit board 65. Consequently, each of the coils 64 is effectively cooled. In addition, because the fusing terminals 81 are located between the fixing pieces 92, the fusing terminals 81 are also effectively cooled by the air that passes through the notched parts (notches) 91.

Moreover, in the rotor 10, the front stopper 74 and the rear stopper 73 are provided at the front and rear, respectively, and consequently movement of the permanent magnets 68 in the front-rear direction is restricted or prevented and the permanent magnets 68 are effectively prevented from coming off of the rotor core 67.

Locating the magnetic sensors 66 circumferentially relative to the rotor 10 at locations corresponding to the centers of the slots 78 provides benefits in a brushless motor like the brushless motor 8, which is a motor having the coils 64 of all phases delta-connected in series. Specifically, the magnetic sensors 66 located in this manner are at least substantially unaffected (or not affected or influenced at all) by the stator magnetic flux, and it is thus possible to perform advance-phase control with an advance angle of 30° without needing to perform software-based advance angle control. This makes it possible to improve motor efficiency.

In addition, attaching the sensor circuit board 65 to the front insulator 61, which is provided on the end surface of the stator 9, makes it possible to easily attach the sensor circuit board 65 at a suitable location using the front insulator 61.

Furthermore, in the above-mentioned embodiment, an advance angle of 30° is obtained by disposing the magnetic sensors 66 at the centers of the slots 78; however, it is not absolutely necessary for the magnetic sensors 66 to be disposed at the centers of the slots 78. For example, the magnetic sensors 66 may be disposed slightly shifted from the centers such as by setting the advance angle to 25° in the forward-rotational direction. However, in this case, the controller 20 must perform software-based compensation control such that the advance angle is also 25° in the reverse-rotational direction. In addition, the magnetic sensors 66 can also be disposed on a surface of the sensor circuit board 65 on the side opposite the stator 9, and the coils 64 may be wound in parallel in a delta connection.

Figure 13A:
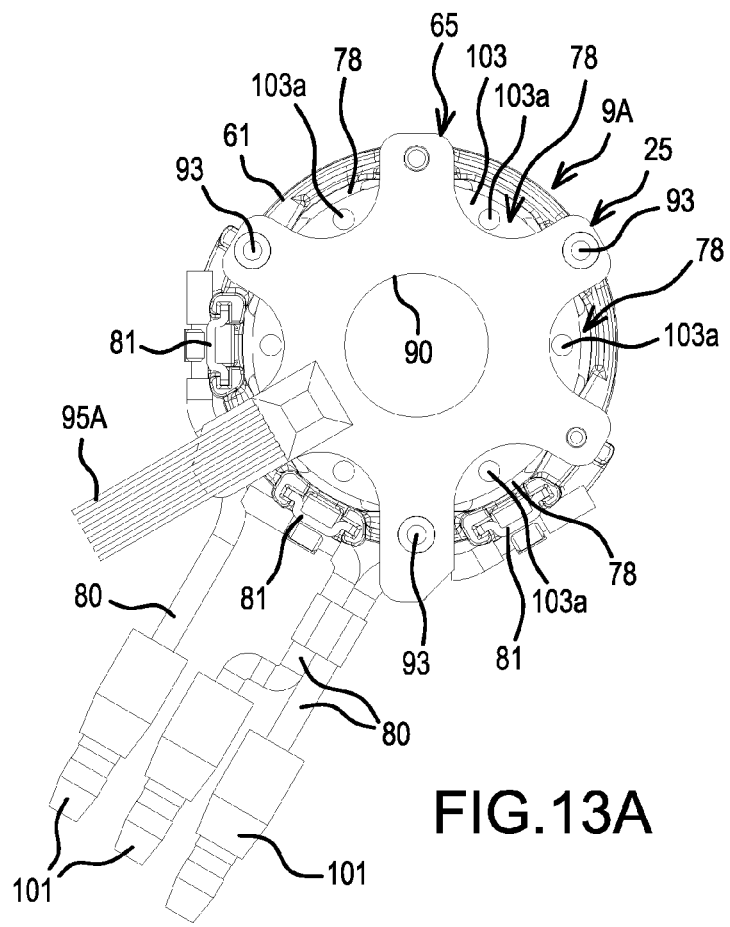
FIG. 13A is a plan view of a stator wherein a heat-dissipating member is used.
Figure 13B:
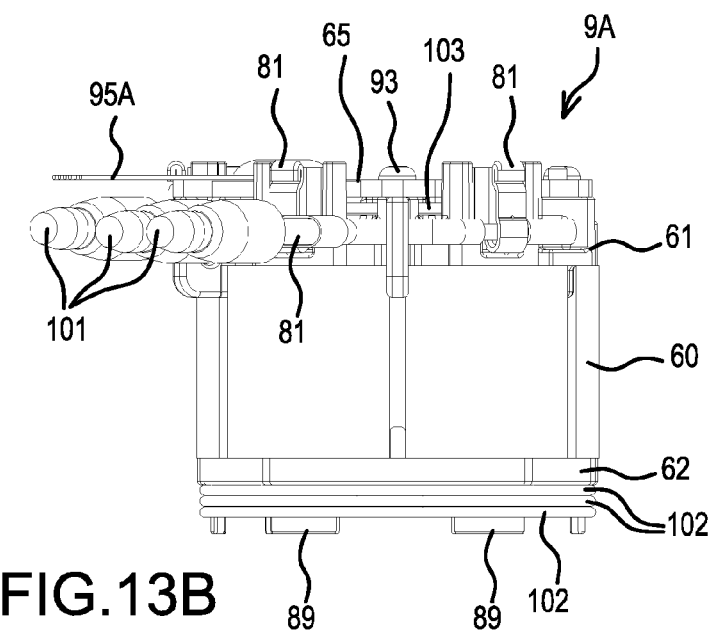
FIG. 13B is a side view thereof.
Figure 15A:
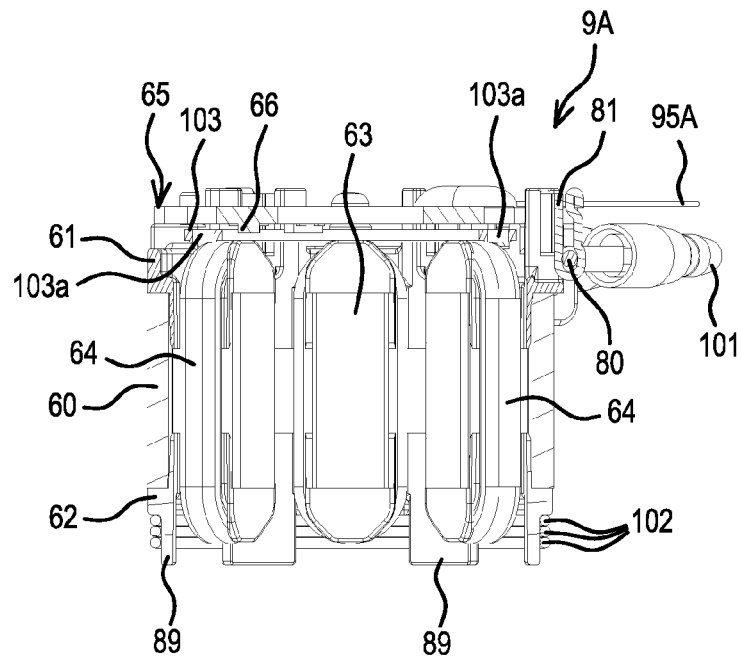
FIG. 15A is a cross-sectional view taken along line A-A in FIG. 14.
Figure 15B:
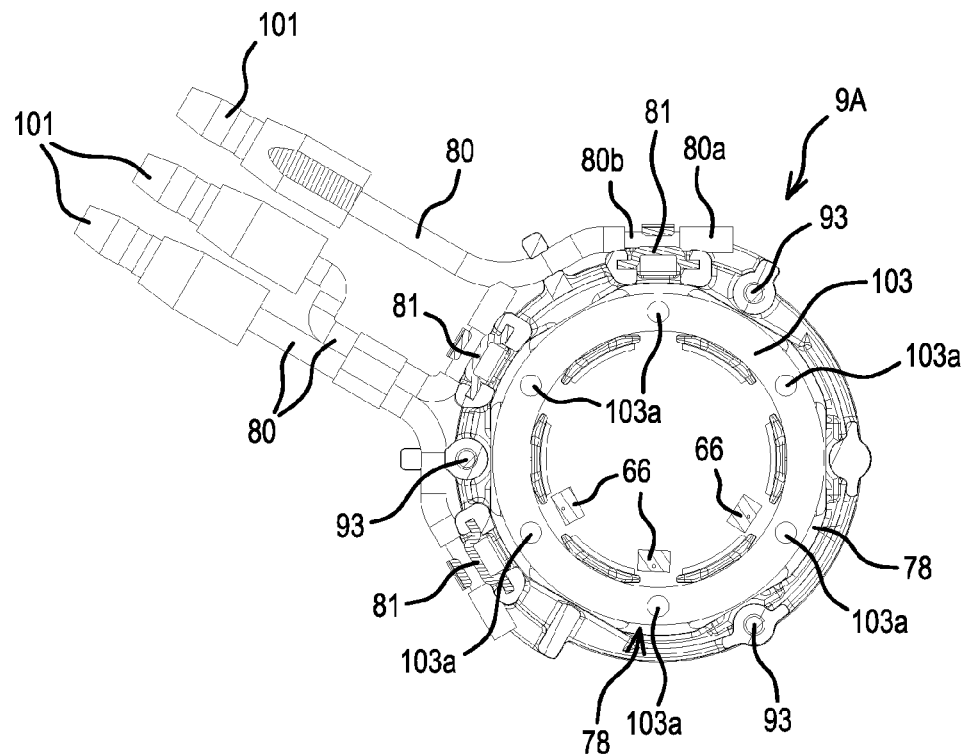
FIG. 15B is a cross-sectional view taken along line B-B in FIG. 14.

Moreover, if the rotational speed of the rotor 10 is set to 24,000 rpm or greater, as was mentioned above, then the amount of current supplied to the coils 64 will increase and the temperature of the coils 64 will tend to rise, if no countermeasures are taken. In this case, it is also possible to provide a heat-dissipating member on the coils 64. Referring to the stator 9A shown in FIGS. 13-15, a heat-dissipating ring 103, which is made of metal and has an inner diameter larger than the layout area of the magnetic sensors 66, may be mounted between the sensor circuit board 65 and the coils 64. The heat-dissipating ring 103 may be adhered to the upper-end surfaces of the coils 64 by a thermally conductive and electrically insulative adhesive. Through holes 103a are provided in the heat-dissipating ring 103 at (corresponding to) the positions of the slots 78. These through holes 103*a* ensure (permit) a flow of air passing through the slots 78 and increase the contact-surface area between the heat-dissipating ring 103 and the air, thereby improving the heat-dissipating effect.

Thus, the heat-dissipating ring 103, which indirectly contacts the coils 64, may inhibit or prevent a rise in the temperature of the coils 64 even if the rotational speed of the rotor 10 increases.

Furthermore, for example, it is also possible: to make the heat-dissipating member arcuate instead of ring shaped and provide a plurality of the heat-dissipating members such that they span the plurality of coils; to provide a separate heat-dissipating member for each coil, avoiding the slots; to provide upright fins on the front surface of the heat-dissipating member; to provide the front surface with a convex and/or concave profile; to further increase the surface area of the heat-dissipating member, etc. The stator may alternately be provided on the rear side instead of the front side.

Figure 16B:
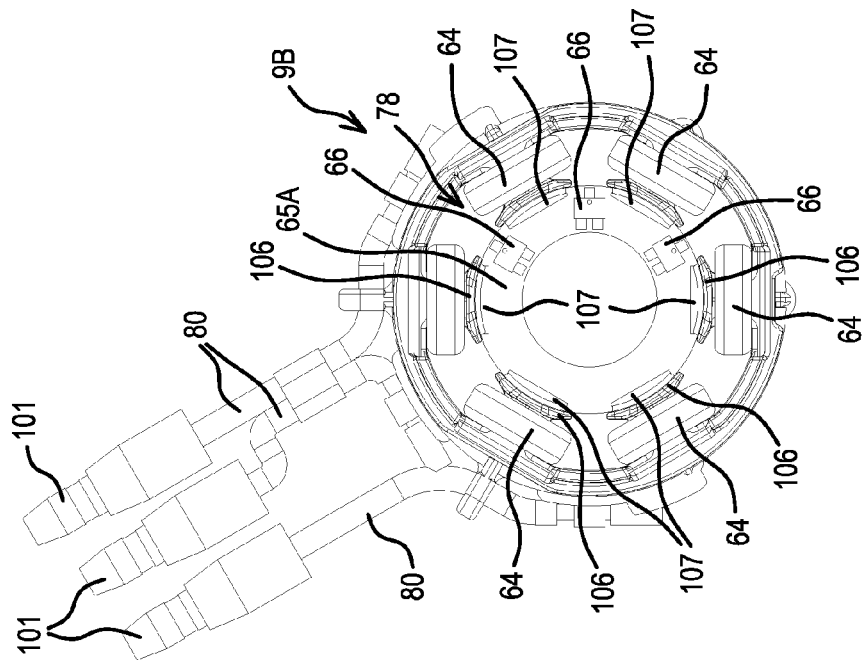
FIG. 16B is a bottom view thereof.
Figure 16A:
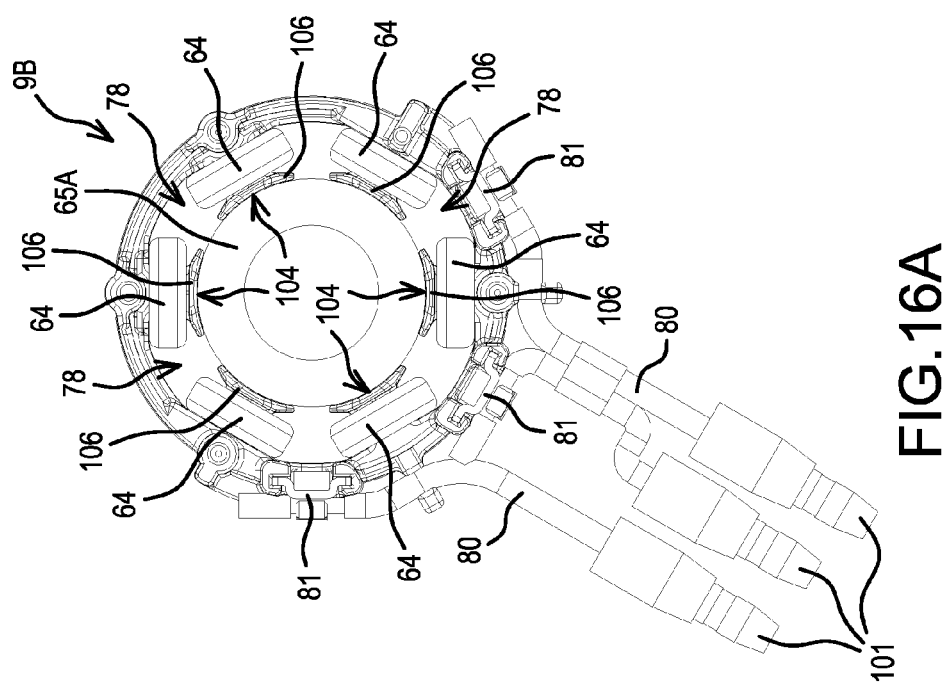
FIG. 16A is a plan view of a stator and a sensor circuit board having a small diameter.
Figure 17B:
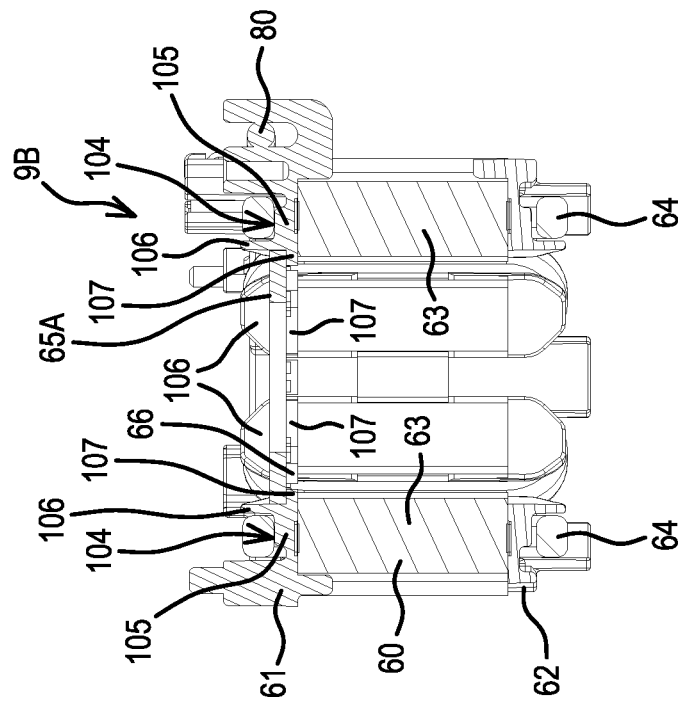
FIG. 17B is a cross-sectional view taken along line C-C in FIG. 17A.
Figure 17A:
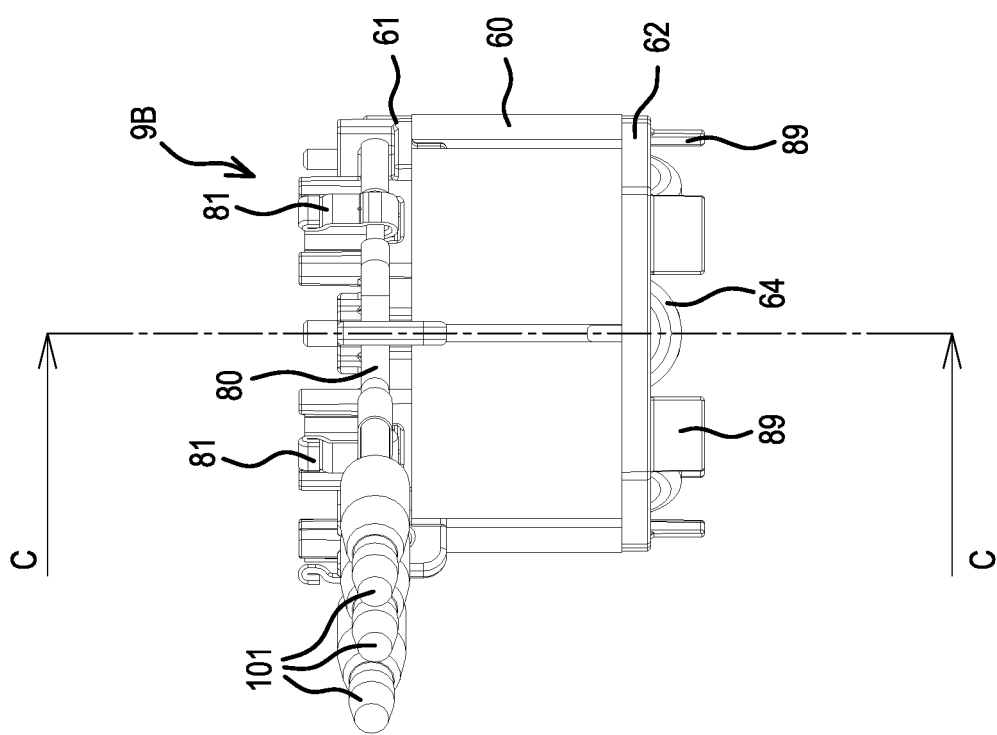
FIG. 17A is a side view of the stator of FIG. 16A.

In addition, the size of the sensor circuit board does not necessarily have to be substantially the same as that of the front insulator. For example, in stator 9B shown in FIGS. 16, 17, the sensor circuit board can also be a ring-shaped (annular) sensor circuit board 65A that has an outer diameter (periphery) at the location of the inner side of the coils 64. Insulating teeth 104 are provided and protrude from the front insulator 61. Each insulating tooth 104 comprising a root part (base) 105 that protrudes toward the axial center side along the front surface of the corresponding tooth 63 and covers the front surface of that tooth 63, and a retainer wall (stop part) 106 that extends upward from the tip of the root part 105 while also widening in the circumferential direction. The retainer wall 106 strengthens or reinforces the insulating tooth 104 and thus prevents the corresponding coil 64 from collapsing (slipping or tilting) inwardly. Furthermore, a tongue-shaped inner-side part 107, on which the outer circumference of the sensor circuit board 65A can be mounted, is provided on an inner-circumferential lower end of each retainer wall 106. This configuration allows the sensor circuit board 65A to be fixed by press fitting, adhering via an adhesive, screw fastening, or the like with its outer circumference in contact with the inner-side parts 107. This is accomplished by pressing the sensor circuit board 65A in, from above, such that it mates with the inner sides of the retainer walls 106. In this case, too, the magnetic sensors 66 may be disposed at (substantially) the centers of the slots 78. However, the lead wires should be led out to the exterior from the upper side or the lower side of the sensor circuit board 65A via the slots 78 and should be wired in the same direction as the power-supply lines 80.

Thus, by disposing the sensor circuit board 65A, whose diameter is smaller than that of the front insulator 61, radially inwardly of the coils 64, the detection accuracy of the magnetic sensors 66 is improved. At the same time, the axial length, the radial dimension, and the like of the brushless motor 8 can be decreased, thereby providing a more compact motor.

Furthermore, the inner-side parts 107 do not necessarily have to be provided on all the retainer walls 106. For example, it is also possible to provide the inner-side part 107 on just every other retainer wall 106, and the shape also can be appropriately modified—as long as the sensor circuit board 65A can be appropriately supported.

In addition, in the above-mentioned embodiments and the modified example shown in FIGS. 13-17, the sensor circuit board 65, 65A is provided on the front insulator 61. However, it is also possible to provide the sensor circuit board 65, 65A on the rear insulator 62 and to wire the crossover wires 102 on the side of the front insulator 61.

Figure 18:
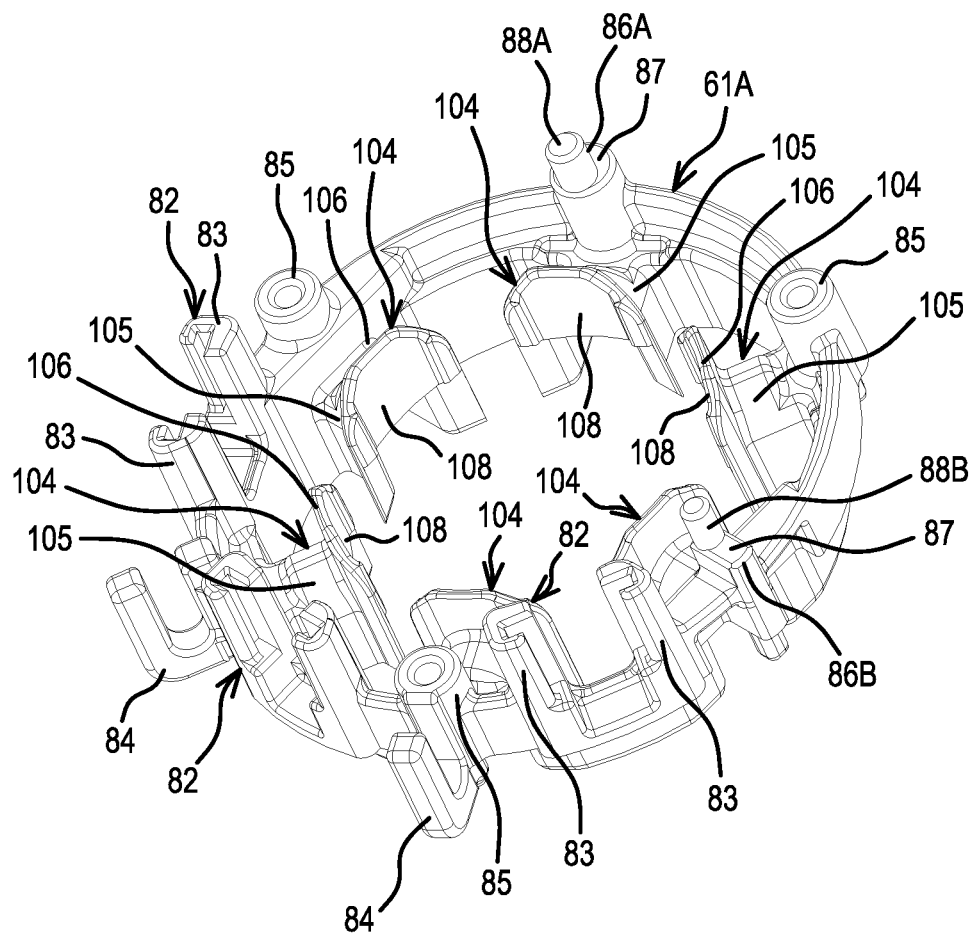
FIG. 18 is an oblique view of a front insulator according to a modified example.
Figure 19A:
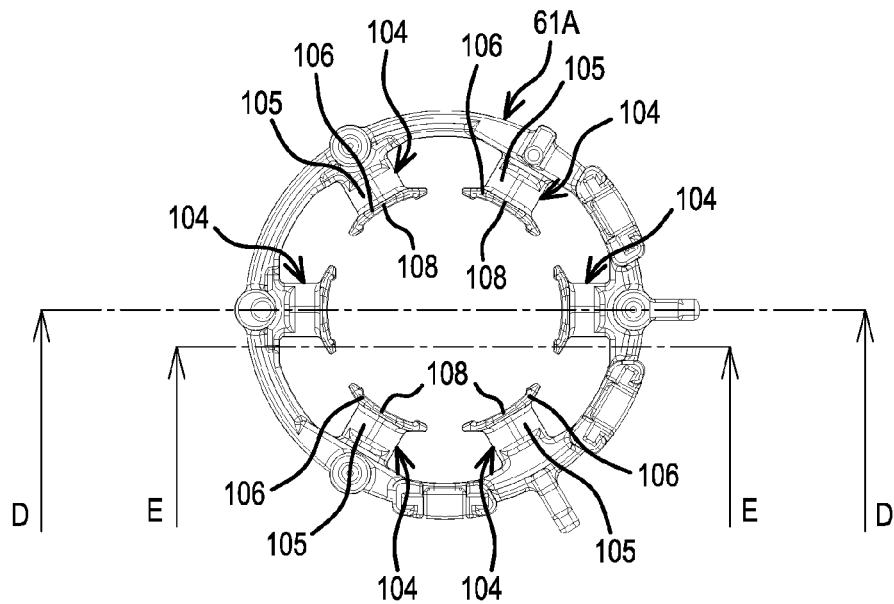
FIG. 19A is a plan view of the front insulator of FIG. 18.
Figure 19B:
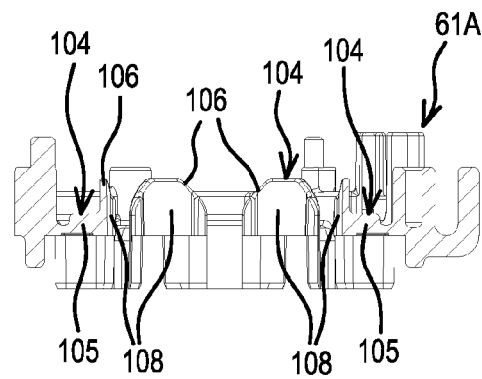
FIG. 19B is a cross-sectional view taken along line D-D in FIG. 19A.
Figure 19C:
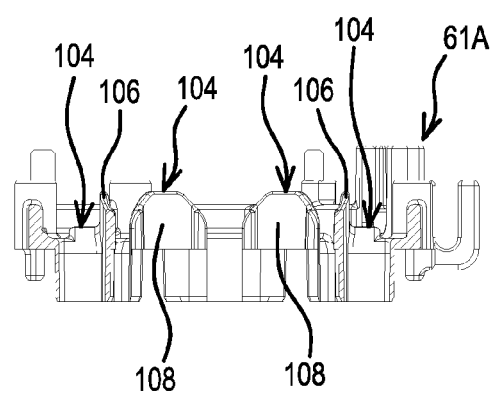
FIG. 19C is a cross-sectional view taken along line E-E in FIG. 19A.

Furthermore, the form (shape) of the front insulator also can be modified, as shown in FIGS. 18, 19. The shape of the front insulator 61 discussed above presents a risk that the retainer walls 106 of the insulating teeth 104 will deform inwardly due to the stress created when the coils 64 are being wound and the (deformed) retainer walls 106 will therefore interfere with the rotor 10. Accordingly, in a front insulator 61A, a recessed part (recess) 108 is formed in the retainer wall 106 of each insulating tooth 104 that hollows out, in the axial direction, the center part of the end surface of the retainer wall 106 on the protruding side. This recess provides the retainer wall 106 with a U shape, and both the front and rear ends of the retainer wall 106 in the rotor rotational direction protrude inwardly (toward the axial center side) from the center part as viewed in the axial direction, thereby reinforcing the retainer wall 106.

Thus the front insulator 61 of the stator 9 is provided with reinforcing means that reinforce the retainer walls 106, thereby increasing the strength of the retainer walls 106 and reducing the risk that the retainer walls 106 will deform inwardly (toward the inner side) due to stress created during the winding of the coils. In addition, even if deformation were to occur, the recessed parts 108 ensure an adequate spacing with regard to the rotor 10, thereby reducing the likelihood of interference with the rotor 10.

As a representative, non-limiting example, as the reinforcing means, each retainer wall 106 may be formed into a U shape, both ends of which protrude radially inwardly, and thereby reinforcement can be easily accomplished.

Furthermore, in addition to forming each retainer wall 106 into a U shape, the reinforcing means can also be strengthened by increasing the wall thickness of the root parts 105, which respectively extend along the teeth 63, in the axial direction of the stator 9. For example, the thickness of the root parts 105 may be made greater than the thickness of the retainer wall 106. In this case, in addition to making the wall thickness the same throughout the extent in the radial direction, it is also possible to vary the wall thickness, either gradually or in steps, as the wall advances toward the center side (progresses radially inwardly). Of course, the thickening of the root part 105 can also be combined with the U shape.

The disclosed embodiment thus includes the stator 9, which comprises: the stator core 60 having the six slots 78; the rear insulator 62 that is fixed to the stator core 60 and holds the plurality of crossover wires 102 between the coils 64 such that they overlap in the axial direction of the stator core 60; and the guide ribs 89 that guide the crossover wires 102 in a direction the reverse of the direction in which the coils 64 are wound; the rotor 10 that is disposed on the inner side of the stator 9; and the drill chuck 4 that is driven by the rotor 10. Because of the presence of the guide ribs 89, the crossover wires 102 can be wired without any slack.

Furthermore, because the winding of the coils 64 around the teeth 63 begins from one side in the circumferential direction of the stator core 60 and ends on an other side in the circumferential direction of the stator core 60, the coils 64 and the crossover wires 102 can be connected smoothly.

Furthermore, in the above-mentioned embodiments, the projection provided on the inner surface of the housing engages the latching recessed part provided on the side surface of the front insulator, and this rotationally locks the front insulator and helps to position it in the front-rear direction of the stator. However, instead or in addition thereto, the rotational locking and the positioning in the front-rear direction of the stator may be performed by providing a projection part on an outer surface of the stator core that is configured to engage a hollow (recess) formed on the inner surface of the housing.

Furthermore, the present teachings are not limited to the arrangements in which the lead wires of the magnetic sensors are connected along radial extensions of the teeth. For example, the lead wires of the magnetic sensors can also be connected along (overlie) the extensions of the slots.

In addition, the magnetic sensors can also be disposed at locations at which they overlap the tips of the teeth in the axial direction (on the outer side of the locations shown in FIG. 9).

Furthermore, in the above-mentioned embodiments, the sensor circuit board is equipped only with the magnetic sensors, but the sensor circuit board also may be provided with a switching device that forms an inverter circuit. In this case, the switching device can also be disposed at a location at which it either overlaps or does not overlap the magnetic sensors in the axial direction.

In addition, power tools according to the present teachings are not limited to a hammer driver-drill, and the present teachings are also applicable to other types of tools such as (without limitation) an impact driver or a grinder, as long as a brushless motor is used as the drive source. The position, orientation, and the like of the motor inside the housing can also be modified as appropriate. In addition, in the above-mentioned embodiments, the coils are formed by one (i.e. a single continuous) wire (winding wire), but it is also possible to form the coils using a plurality of winding wires, such as two or three winding wires. In the brushless motor, too, the number of poles, the number of slots, and the like can be increased. Moreover, the present teachings are applicable even if the magnets are curved along the rotational direction, the magnets are surface permanent magnet (SPM-type) magnets that are incorporated on the front surface of the rotor, or the like.

Furthermore, the following modifications to the disclosed embodiment are also encompassed by the present teachings:

(1) A power tool wherein the rotational speed of the brushless motor that constitutes the drive source is in the range of 30,000-40,000 rpm.

(2) A power tool wherein the battery voltage that constitutes the power supply is 10.8 V or more and the rotational speed of the motor is 24,000 rpm or greater.

(3) A power tool wherein the outer diameter of the stator of the brushless motor that constitutes the drive source is less than 40 mm and the rotational speed is 24,000 rpm or greater.

(4) A power tool comprising:
a stator core;
an electrically insulating member (in the above-mentioned embodiments, the front insulator 61, 61A) fixed to the stator core; and
one or more coils wound around the stator core via the electrically insulating member; wherein,
the electrically insulating member comprises protruding parts (in the above-mentioned embodiments, the retainer walls 106) disposed on the inner side of the coil(s); and
the sensor circuit board is screw-fastened to the protruding parts.

(5) A power tool, comprising:
a stator core;
an electrically insulating member (the front insulator) fixed to the stator core; and
one or more coils wound around the stator core via the electrically insulating member; wherein, the electrically insulating member comprises a protruding part disposed on the inner side of the coil(s); and
the sensor circuit board is disposed on the inner side of the protruding part.

(6) A power tool, comprising:
a stator core;
an electrically insulating member (front-and-rear insulators) fixed to the stator core; and
one or more coils wound around the stator core via the electrically insulating member; wherein,
the electrically insulating member comprises a protruding part disposed on the inner side of the coil(s); and
an electrical component is disposed on the inner side of the protruding part.

In addition to the sensor circuit board, the electrical component may be the crossover wires, the fusing terminals, the lead wires, the switching devices, the short-circuiting members, the capacitors, the temperature sensors, or the like. Furthermore, a plurality of these electrical components can also be disposed on the inner side of the protruding part.

In addition, in the present teachings, the magnetic sensors are disposed at substantially the centers of the slots, but the present teachings are also applicable to a Y connection stator.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings to provide improved power tools.

Moreover, combinations of features and steps disclosed in the above detailed description, as well as in the below additional examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

1 Hammer driver-drill
2 Main body
3 Handle
4 Drill chuck
5 Battery pack
6 Housing
8 Brushless motor 9, 9A, 9B Stator
10 Rotor
11 Rotary shaft
12 Gear assembly
13 Spindle
20 Controller
33 Planetary-gear, speed-reducing mechanism
60 Stator core
61, 61A Front insulator
62 Rear insulator
63 Tooth
63 Coil
65, 65A Sensor circuit board
66 Magnetic sensor
67 Rotor core
68 Permanent magnet
70 Centrifugal fan
71 Air-exhaust port
72 Air-suction port
75 Groove
76 Mating piece
78 Slot
79 Wire
80 Power-supply line
81 Fusing terminal
82 Retaining part
89 Guide rib
95A, 95B Lead wires
96A, 96B Connectors
101 Bullet terminal
103 Heat-dissipating ring
104 Insulating tooth
105 Root part
106 Retainer wall (Stop part)
107 Inner-side part
108 Recessed part

The invention claimed is:

1. A power tool, comprising:
    a stator having a plurality of radially inwardly extending teeth separated by slots and coils respectively wound around each tooth of the plurality of teeth, wherein different sets of the coils correspond to different phases, the different sets of the coils are delta-connected in series;
    a rotor having magnets and being configured to rotate in the interior of the stator; and
    a sensor circuit board fixed to the stator and having magnetic sensors configured to detect rotation of the rotor;
    wherein the magnetic sensors are provided at least substantially at the centers of the slots in a rotational direction of the rotor.

2. The power tool according to claim 1, wherein the sensor circuit board is attached to an electrically insulating member on an end surface of the stator.

3. The power tool according to claim 2, wherein:
    the rotor has an outermost circumferential portion lying on a first circle and
    the magnetic sensors are disposed along the first circle.

4. The power tool according to claim 1, wherein:
    the rotor has an outermost circumferential portion lying on a first circle and
    the magnetic sensors are disposed along the first circle.

5. The power tool according to claim 1, wherein the rotor has a non-circular outer shape.

6. The power tool according to claim 5, wherein:
    the rotor has a large outer circumferential portion lying on a first circle and small outer circumferential portion lying on a second circle and
    the magnetic sensors are disposed on a radially outer side of the second circle.

7. The power tool according to claim 1, wherein an axial groove is formed on an outer circumference of the stator radially outward of at least one tooth of the plurality of teeth.

8. The power tool according to claim 1, wherein the sensor circuit board is screw fastened to the stator at a location along an extension of at least one tooth of the plurality of teeth.

9. The power tool according to claim 1, wherein:
    the sensor circuit board is attached to an electrically insulating member on an end surface of the stator,
    the rotor has an outermost circumferential portion lying on a first circle,
    the magnetic sensors are disposed along the first circle,
    the rotor has a non-circular outer shape,
    an axial groove is formed on an outer circumference of the stator radially outward of at least one tooth of the plurality of teeth, and
    the sensor circuit board is screw fastened to the stator at a location along an extension of at least one tooth of the plurality of teeth.

10. The power tool according to claim 1, further including an electrically insulating member fixed to the stator;
    wherein the coils are respectively wound around each tooth of the plurality of teeth via the electrically insulating member; and
    the electrically insulating member comprises retainer walls configured to prevent the coils from collapsing inward, and reinforcing means for reinforcing the retainer walls.

11. The power tool according to claim 1, further comprising:
    an electrically insulating member that is fixed to the stator and that includes a plurality of guide ribs; and
    a tool-accessory retaining part driven by the rotor,
    wherein a plurality of crossover wire portions are arranged axially adjacent to one another on the plurality of guide ribs,
    at least one of the plurality of crossover wire portions runs in a direction opposite the winding direction, and
    the plurality of radially inwardly extending teeth are six teeth and the slots are six slots.

12. The power tool according to claim 11, wherein two of the crossover wire portions are led out from one of the coils.

13. The power tool according to claim 11, wherein the at least one of the plurality of crossover wire portions comprises all the plurality of crossover wire portions.

14. The power tool according to claim 11, wherein the wire is wound around each of the six teeth starting from one side in a circumferential direction of the stator and ending on an other side in the circumferential direction of the stator.

15. The power tool according to claim 14, wherein two of the crossover wire portions are led out from one of the coils.

16. The power tool according to claim 15, wherein the at least one of the plurality of crossover wire portions comprises all the plurality of crossover wire portions.

17. The power tool according to claim 5, wherein:
    the rotor has a large outer circumferential portion lying on a first circle and small outer circumferential portion lying on a second circle, and
    the magnetic sensors are disposed on a radially outer side of the second circle and at least partially on a radially inner side of the first circle.

18. A power tool comprising:
a stator having a plurality of radially inwardly extending teeth separated by slots and coils respectively wound around each tooth of the plurality of teeth;
a rotor having magnets and a rotor core that has a first outer circumferential width and a second outer circumferential width; and
a sensor circuit board fixed to the stator and having magnetic sensors configured to detect rotation of the rotor;
wherein the magnetic sensors are at least partially located between the first outer circumferential width and the second outer circumferential width of the rotor core.

19. The power tool according to claim 18, wherein the rotor has four magnets and the stator has six teeth.

20. The power tool according to claim 19, wherein six axial grooves are formed in the circumferential direction at a constant interval on an outer circumference of the stator core, the grooves being respectively disposed at locations along extensions of the respective teeth.

\* \* \* \* \*